US012594752B2

(12) United States Patent
Wei

(10) Patent No.: US 12,594,752 B2
(45) Date of Patent: *Apr. 7, 2026

(54) IN-LINE LAMINATION PROCESS FOR PRODUCING THERMOPLASTIC COMPOSITE PANELS WITH TEXTURED FILM LAYERS

(71) Applicant: Hanwha Azdel Inc., Forest, VA (US)

(72) Inventor: Liqing Wei, Forest, VA (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/525,469

(22) Filed: Nov. 12, 2021

(65) Prior Publication Data

US 2022/0332106 A1      Oct. 20, 2022

Related U.S. Application Data

(60) Provisional application No. 63/188,358, filed on May 13, 2021, provisional application No. 63/145,073,
(Continued)

(51) Int. Cl.
*B32B 37/06* (2006.01)
*B32B 3/30* (2006.01)
(Continued)

(52) U.S. Cl.
CPC ................ *B32B 37/06* (2013.01); *B32B 3/30* (2013.01); *B32B 5/028* (2013.01); *B32B 7/12* (2013.01); *B32B 27/08* (2013.01); *B32B 27/12* (2013.01); *B32B 27/20* (2013.01); *B32B 27/32* (2013.01); *B32B 37/10* (2013.01); *B32B 37/12* (2013.01); *B32B 37/144* (2013.01); *B32B 37/156* (2013.01); *B32B 38/0004* (2013.01);

*B32B 38/06* (2013.01); *B32B 38/145* (2013.01); *B32B 2255/10* (2013.01); *B32B 2255/26* (2013.01); *B32B 2262/101* (2013.01); *B32B 2305/022* (2013.01); *B32B 2305/08* (2013.01); *B32B 2305/18* (2013.01); *B32B 2307/4026* (2013.01);
(Continued)

(58) Field of Classification Search
None
See application file for complete search history.

(56) References Cited

U.S. PATENT DOCUMENTS 3,684,645 A * 8/1972 Temple ................... B29C 70/12
428/338
5,316,604 A * 5/1994 Fell ................... B29C 66/91931
428/116
(Continued)

FOREIGN PATENT DOCUMENTS

EP           838320 A2 * 4/1998 ............. B29C 33/12
WO    WO-2016183079 A1 * 11/2016 ............... B32B 5/18

*Primary Examiner* — Linda L Gray
(74) *Attorney, Agent, or Firm* — Rhodes IP PLC; Christopher R Rhodes

(57) ABSTRACT

In-line systems and in-line methods are described that can be used to provide lightweight reinforced thermoplastic composite articles that include a textured film layer. The textured film layer can provide one or more of water resistance, flame retardancy, a desired surface roughness or other desired properties. The lightweight reinforced thermoplastic composite articles that include a textured film layer can be used in building applications, in recreational vehicle applications and in other applications as desired.

20 Claims, 24 Drawing Sheets

Related U.S. Application Data filed on Feb. 3, 2021, provisional application No. 63/112,914, filed on Nov. 12, 2020.

(51) Int. Cl.

| | |
|---|---|
| *B32B 5/02* | (2006.01) |
| *B32B 7/12* | (2006.01) |
| *B32B 27/08* | (2006.01) |
| *B32B 27/12* | (2006.01) |
| *B32B 27/20* | (2006.01) |
| *B32B 27/32* | (2006.01) |
| *B32B 37/00* | (2006.01) |
| *B32B 37/10* | (2006.01) |
| *B32B 37/12* | (2006.01) |
| *B32B 37/14* | (2006.01) |
| *B32B 38/00* | (2006.01) |
| *B32B 38/06* | (2006.01) |

(52) U.S. Cl.
CPC ..... *B32B 2307/538* (2013.01); *B32B 2307/54* (2013.01); *B32B 2307/718* (2013.01); *B32B 2307/7265* (2013.01); *B32B 2307/732* (2013.01); *B32B 2323/00* (2013.01); *B32B 2323/10* (2013.01); *B32B 2419/00* (2013.01); *B32B 2605/00* (2013.01)

(56) References Cited

U.S. PATENT DOCUMENTS

| | | | | |
|---|---|---|---|---|
| 2003/0159777 | A1* | 8/2003 | Tsujimoto | B32B 38/1816 156/543 |
| 2003/0224145 | A1* | 12/2003 | Campion | D04H 1/72 264/172.19 |
| 2020/0277214 | A1* | 9/2020 | Courtemanche | G02B 5/0215 |

* cited by examiner 302    304    306

306    402    410

410

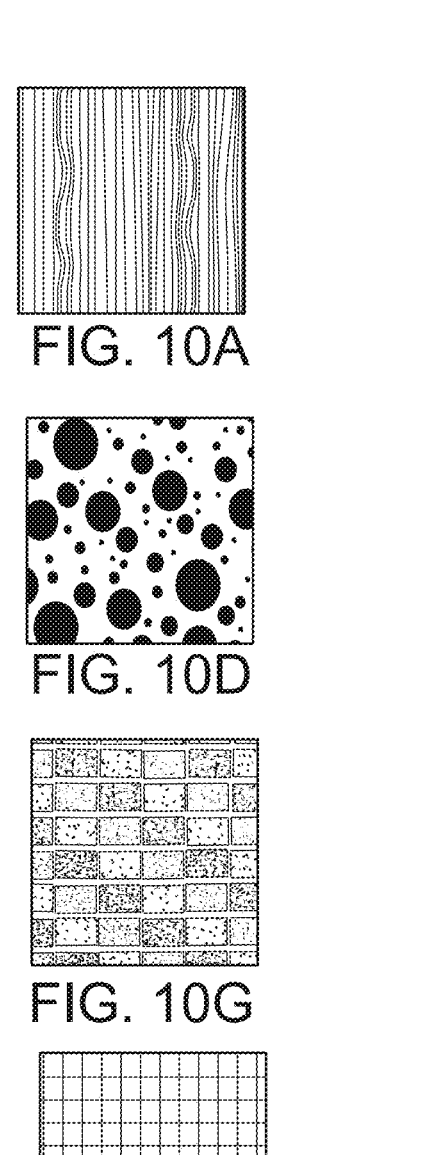
FIG. 10A
FIG. 10B
FIG. 10C
FIG. 10D
FIG. 10E
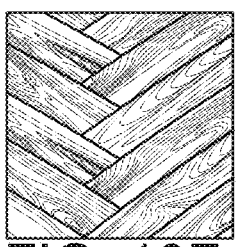
FIG. 10F
FIG. 10G
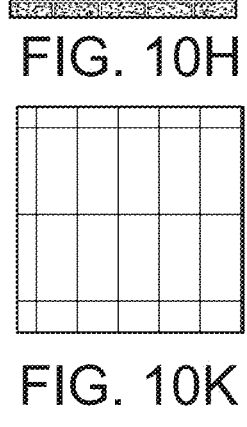
FIG. 10H
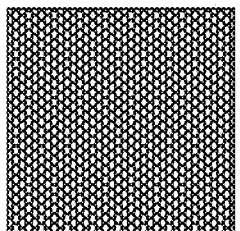
FIG. 10I
FIG. 10J
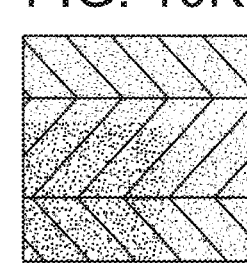
FIG. 10K
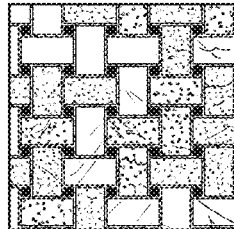
FIG. 10L
FIG. 10M
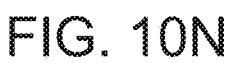
FIG. 10N
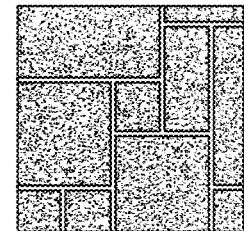
FIG. 10O
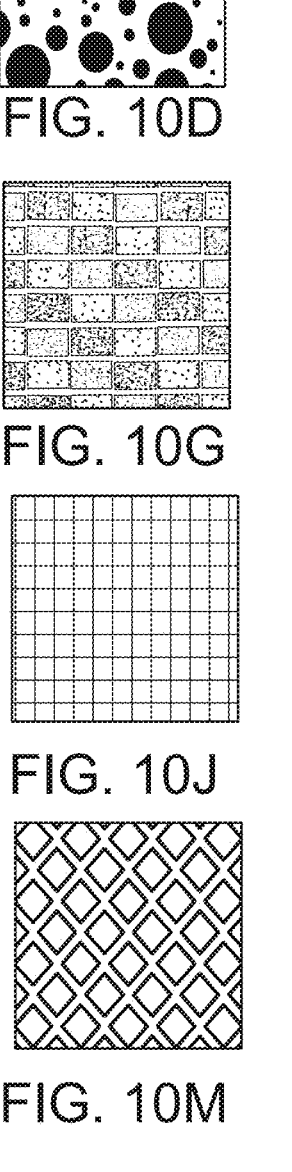

1200

1250
1246
1240  1242  1244
1230
1220
1214
1210  1212  1216

1300

1312

1313

1314  1316

1352  1354

1410

1450

1510

1500

1520

1530

1560

1550

Table 1

| Film code | Film basis weight (g/m2) | Film thickness (mm) | Decorative effect | Adhesive layer or not on back side | Base film main layer | Decorative pattern general name |
|---|---|---|---|---|---|---|
| Film #1 | 128 | 0.2 | Printed based film + Embossment + Top thermoset coating | Yes (PE) | PP/PE blend | Random square pattern |
| Film #2 | 142 | 0.21 | Embossment only (deep embossment) | Yes (PE) | PP/PE blend | White woodgrain |
| Film #3 | 130 | 0.21 | Printed based film + Embossment + Top thermoset coating | Yes (PE) | PP/PE blend | Dark woodgrain |
| Film #4 | 166 | 0.30 | Printed base film + deep embossment with rough/coarse spikes on backside | No | PP | Dark fabric pattern |
| Film #5 | 110 | 0.17 | Printed base film + shallow Embossment | No | PP | Grey fabric pattern |
| Film #6 | 144 | 0.19 | Printed base film + shallow Embossment | No | PP | Coarse fabric pattern |

FIG. 16

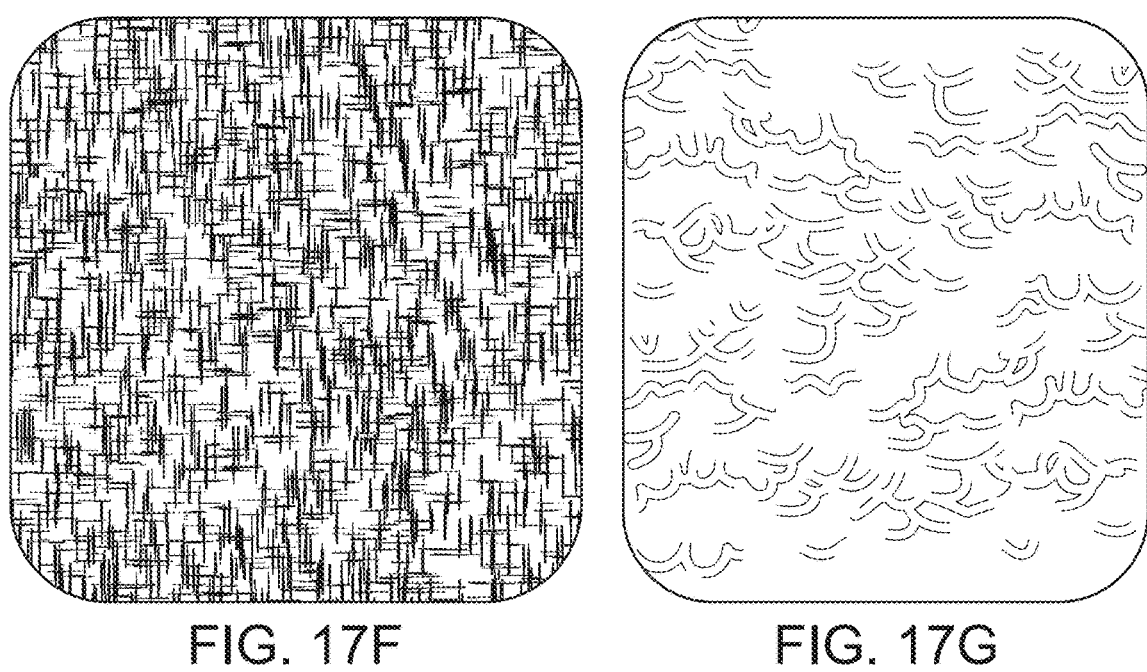
FIG. 17F
FIG. 17G
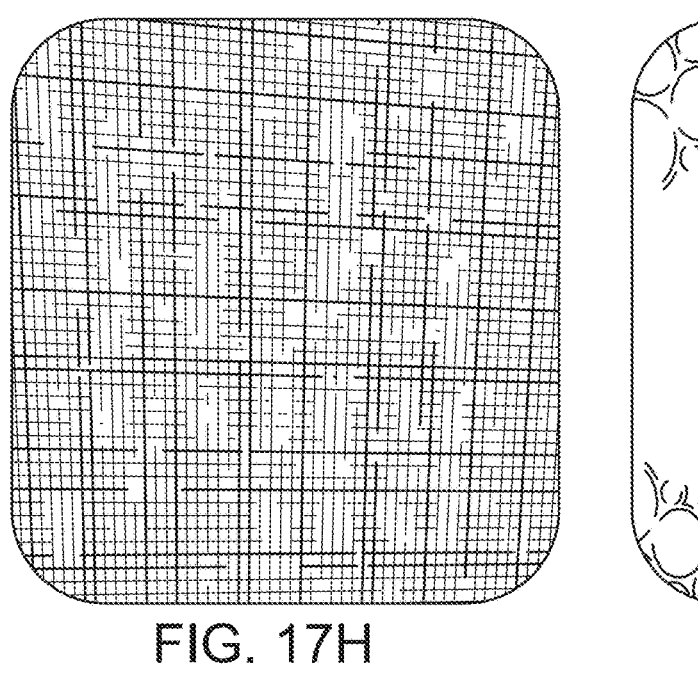
FIG. 17H
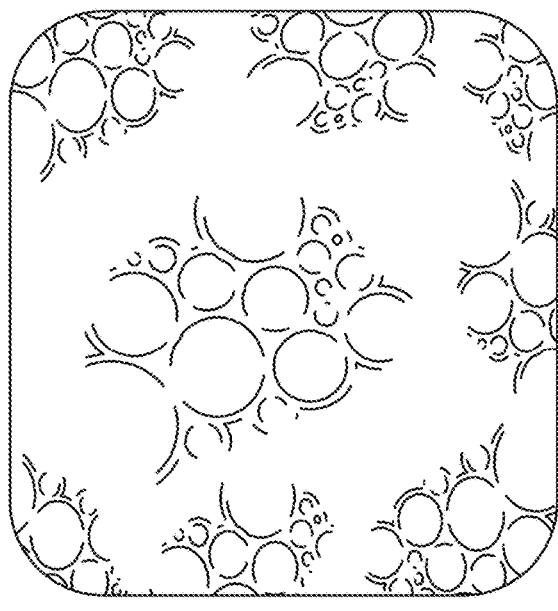
FIG. 17I

Table 2

| ST# | Decorative film – A-surface | Skin on B-surface | Core basis weight (g/m2) |
|-----|------------------------------|-------------------|--------------------------|
| ST-13731 | Film #1 | 23gsm water repellent black scrim | 960 |
| ST-13636 | Film #2 | 23gsm water repellent black scrim | 960 |
| ST-13929 | Film #3 | 23gsm water repellent black scrim | 960 |
| ST-13799 | Film #4 | 23gsm water repellent black scrim | 960 |
| ST-13928 | Film #5 | 23gsm water repellent black scrim | 960 |
| ST-13965 | Film #6 | 23gsm water repellent black scrim | 960 |

FIG. 18

Table 3

| Sample | $R_t$ in MD (µm) | $R_t$ in CD (µm) |
| --- | --- | --- |
| Film #1 | 70.6 ± 10.6 | 56.1 ± 7.6 |
| ST-13731 (from Film #1) | 46.4 ± 11.1 | 56.5 ± 13.0 |
| Film #2 | 25.0 ± 12.8 | 61.5 ± 13.6 |
| ST-13636 (from Film #2) | 20.3 ± 9.7 | 60.0 ± 11.9 |
| Film #3 | 51.5 ± 12.4 | 62.3 ± 14.9 |
| ST-13929 (from Film #3) | 39.9 ± 6.1 | 45.8 ± 7.8 |
| Film #4 | 39.1 ± 15.8 | 44.5 ± 19.7 |
| ST-13799 (from Film #4) | 21.7 ± 9.8 | 22.7 ± 9.0 |
| Film #5 | 25.9 ± 8.4 | 29.6 ± 10.0 |
| ST-13928 (from Film #5) | 12.4 ± 2.0 | 13.0 ± 4.0 |
| Film #6 | 20.5 ± 6.2 | 21.6 ± 3.8 |
| ST-13965 (from Film #6) | 9.4 ± 3.9 | 14.2 ± 5.9 |

FIG. 19

Table 4

| Sample | Fire retardancy (inch/min) Standard - FMVSS 302 (inch/min) |
|---|---|
| ST-13731 | $1.64 \pm 0.15$ |
| ST-13636 | $1.75 \pm 0.09$ |
| ST-13929 | $1.93 \pm 0.01$ |
| ST-13799 | $1.71 \pm 0.10$ |
| ST-13928 | $2.28 \pm 0.23$ |
| ST-13965 | $1.91 \pm 0.11$ |

FIG. 20

Table 5

| Properties | Method | ST 13731 | ST 13838 | ST 13929 |
|---|---|---|---|---|
| Ash (%) | ASTM D5630 | 50.7 ± 0.1 | 51.5 ± 0.4 | 50.8 ± 0.4 |
| Thickness (mm) | SPI (LF-477 rev1) | 2.97 ± 0.04 | 2.93 ± 0.05 | 3.00 ± 0.04 |
| Basis weight (gsm) | SPI (TL-0033) | 1134 ± 4 | 1099 ± 7 | 1109 ± 16 |
| Density (g/cm³) | ASTM D3574 | 0.37 ± 0.01 | 0.35 ± 0.00 | 0.37 ± 0.01 |
| Scrim adhesion (lbs) | ASTM D903 | Scrims cannot be separated from core | Scrims cannot be separated from core | Peel could not be initiated |
| Film core adhesion (lbs) | ASTM D903 | Could not peel under ambient and after environmental aging | Ambient: MD = 4.8 ± 0.5, CD = 5.1 ± 0.8; Environmentally aged: MD = 3.4 ± 0.7, CD = 3.4 ± 0.8 | Ambient: MD: 10 of 20 specimens: peak load 3.0±0.4lbs; the other 10 specimens could not be initiated. (Mixed results due to peak/valley of the backside of the embossed film). CD: 4 specimens of the 20: peak laod 3.4 ± 0.5lbs; the rest 16 specimens could not be initiated (Mixed results due to peak/valley of the backside of the embossed film) Environmentally aged: MD 5.4±2.6lbs; CD 4.6±1.6 |
| Flexural peak load (N) | ASTM D790 | Scrim side against load: MD = 29.5 ± 2.5, CD = 21.1 ± 2.8; Film side against load: MD = 34.5 ± 2.5, CD = 25.3 ± 1.2 | Scrim side against load: MD = 28.4 ± 1.8, CD = 19.4 ± 0.9; Film side against load: MD = 35.6 ± 1.7, CD = 20.9 ± 1.1 | Scrim side against load: MD = 26.5± 2.2, CD = 18.8±2.4; Film side against load: MD = 32.6±4.3, CD = 16.5±1.9 |
| Flexural stiffness (N/cm) | ASTM D790 | Scrim side against load: MD =148.4±17.8, CD = 83.5±8.6; Film side against load: MD = 150.6±9.8, CD = 86.6±3.4 | Scrim side against load MD =154.4±9.0, CD = 85.6±5.0; Film side against load: MD = 160.9±16.1, CD = 88.9±5.6 | Scrim side against load: MD = 155.4±9.2, CD = 73.3±9.8; Film side against load: MD = 171.1±18.8, CD = 82.5±12.7 |
| Water retention (Cobb) (%) | SPI (TL-0052) | Scrim side: 9.9 ± 1.2; Film side: 0.0 ± 0.0 | Scrim side: 8.7 ± 0.6; Film side: 0.0 ± 0.0 | Scrim side: 5.5 ± 0.3; Film side: 0.0 ± 0.0 |
| Surface energy (dynes/cm) | SPI (TL-0053) | Scrim side: 30 ± 2 | Scrim side: 30 ± 2 | Scrim side: 30 ± 2 |
| Flat wise tensile peak load (N) | ASTM C297 | 1394 ± 230 (Failed within core) | 1139 ± 186 (Failed within core) | 1190 ± 301 (Failed within core near black scrim surface) |

FIG. 21

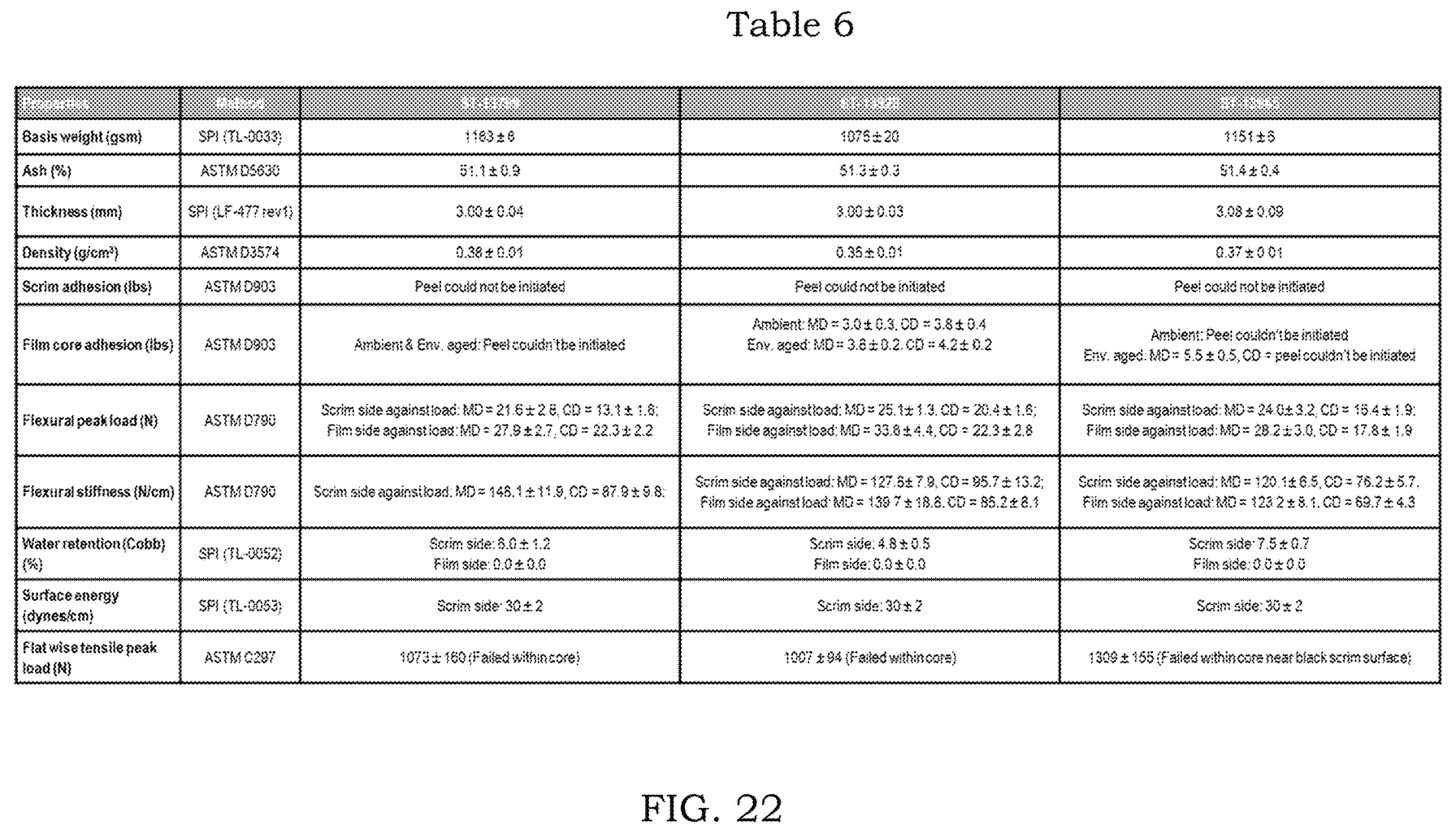

Table 6

| | Method | | | |
|---|---|---|---|---|
| Basis weight (gsm) | SPI (TL-0039) | 1183 ± 6 | 1076 ± 20 | 1151 ± 6 |
| Ash (%) | ASTM D5630 | 51.1 ± 0.9 | 51.3 ± 0.3 | 51.4 ± 0.4 |
| Thickness (mm) | SPI (LF-477 rev1) | 3.00 ± 0.04 | 3.00 ± 0.03 | 3.08 ± 0.09 |
| Density (g/cm³) | ASTM D3574 | 0.38 ± 0.01 | 0.36 ± 0.01 | 0.37 ± 0.01 |
| Scrim adhesion (lbs) | ASTM D903 | Peel could not be initiated | Peel could not be initiated | Peel could not be initiated |
| Film core adhesion (lbs) | ASTM D903 | Ambient & Env. aged: Peel couldn't be initiated | Ambient MD = 3.0 ± 0.3, CD = 3.8 ± 0.4 Env. aged: MD = 3.6 ± 0.2, CD = 4.2 ± 0.2 | Ambient: Peel couldn't be initiated Env. aged: MD = 5.5 ± 0.5, CD = peel couldn't be initiated |
| Flexural peak load (N) | ASTM D790 | Scrim side against load: MD = 21.6 ± 2.6, CD = 13.1 ± 1.6; Film side against load: MD = 27.9 ± 2.7, CD = 22.3 ± 2.2 | Scrim side against load: MD = 25.1 ± 1.3, CD = 20.4 ± 1.6; Film side against load: MD = 33.8 ± 4.4, CD = 22.3 ± 2.8 | Scrim side against load: MD = 24.0 ± 3.2, CD = 15.4 ± 1.9; Film side against load: MD = 28.2 ± 3.0, CD = 17.8 ± 1.9 |
| Flexural stiffness (N/cm) | ASTM D790 | Scrim side against load: MD = 146.1 ± 11.9, CD = 87.9 ± 5.8 | Scrim side against load: MD = 127.5 ± 7.9, CD = 95.7 ± 13.2; Film side against load: MD = 139.7 ± 18.6, CD = 86.2 ± 8.1 | Scrim side against load: MD = 120.1 ± 6.5, CD = 76.2 ± 5.7; Film side against load: MD = 123.2 ± 8.1, CD = 69.7 ± 4.3 |
| Water retention (Cobb) (%) | SPI (TL-0052) | Scrim side: 3.0 ± 1.2 Film side: 0.0 ± 0.0 | Scrim side: 4.8 ± 0.5 Film side: 0.0 ± 0.0 | Scrim side: 7.5 ± 0.7 Film side: 0.0 ± 0.0 |
| Surface energy (dynes/cm) | SPI (TL-0053) | Scrim side: 30 ± 2 | Scrim side: 30 ± 2 | Scrim side: 30 ± 2 |
| Flat wise tensile peak load (N) | ASTM C297 | 1073 ± 160 (Failed within core) | 1007 ± 94 (Failed within core) | 1309 ± 155 (Failed within core near black scrim surface) |

FIG. 22

IN-LINE LAMINATION PROCESS FOR PRODUCING THERMOPLASTIC COMPOSITE PANELS WITH TEXTURED FILM LAYERS

PRIORITY APPLICATIONS

This application claims priority to, and the benefit of, each of U.S. Application No. 63/112,914 filed on Nov. 12, 2020, U.S. Application No. 63/145,073 filed on Feb. 3, 2021 and U.S. Application No. 63/188,358 filed on May 13, 2021. The entire disclosure of each of these applications is hereby incorporated herein by reference.

TECHNOLOGICAL FIELD

Certain configurations described herein are directed to an in-line lamination process that can produce a thermoplastic composite panel including a textured film layer. In some examples, the panel can be used in building applications, recreational vehicles and other areas where a waterproof panel may be desired.

BACKGROUND

Production of decorative panels can be time consuming and tedious. In many cases, different components of the panels are produced in different processes or at different sites.

SUMMARY

Certain aspects, configurations, embodiments and examples are described of in-line processes that can be used to produce panels that include a textured film layer that can be used in recreational vehicles, building applications, in wet applications and in other areas.

In an aspect, an in-line process of producing a thermoplastic composite article using an in-line system is described. In certain embodiments, the in-line process comprises combining reinforcing materials and a thermoplastic material in an aqueous solution, disposing the aqueous solution with the combined reinforcing materials and the thermoplastic material onto a moving support, removing water from the disposed aqueous solution on the moving support to form a web comprising open cell structures formed from the reinforcing materials and the thermoplastic material, drying the web on the moving support to provide a porous core layer, heating the dried, porous core layer on the moving support to melt the thermoplastic material of the heated, porous core layer, disposing a first textured film layer on a first surface of the heated, porous core layer on the moving support, and applying pressure to the heated, porous core layer comprising the disposed first textured film layer on the moving support to provide a thermoplastic composite article.

In certain configurations, the porous core layer is heated at a first temperature above the melting point of the thermoplastic material and below the melting point of the reinforcing materials. In some examples, the method comprises adding a foam to the aqueous solution with the combined reinforcing materials and the thermoplastic material. In other examples, the method comprises adding a lofting agent to the aqueous solution with the combined reinforcing materials and the thermoplastic material. In some embodiments, the method comprises configuring the first textured film layer as a polyolefin film. In certain examples, the method comprises configuring the polyolefin film to comprise a maximum height surface roughness (Rt) of at least 8 microns as measured using a stylus profilometer.

In additional examples, the first textured film layer further comprises a pattern. In some embodiments, the pattern is one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern.

In some embodiments, the thermoplastic material comprises a polyolefin and the reinforcing materials comprise inorganic fibers.

In other embodiments, the method comprises stretching the first textured film layer prior to disposing the first textured film layer on the first surface of the heated, porous core layer on the moving support.

In additional embodiments, the first textured film layer is stretched in a machine direction.

In certain embodiments, the first textured film layer is disposed on the heated, porous core layer without using any adhesive between the first textured film layer and the heated, porous core layer.

In some embodiments, the method comprises disposing a skin layer on the second surface of the heated, porous core layer on the moving support.

In certain examples, the method comprises disposing an adhesive on the second surface of the heated, porous core layer prior to disposing the skin layer on the second surface.

In some embodiments, the method comprises configuring the thermoplastic composite article to meet a class B standard as tested by ASTM E84 dated 2009.

In other embodiments, the method comprises configuring the thermoplastic composite article to meet a class A standard as tested by ASTM E84 dated 2009.

In certain embodiments, the method comprises consolidating the heated, and porous core layer prior to disposing the first textured film layer on the first surface. In some examples, the method comprises heating the thermoplastic composite article after consolidating the thermoplastic composite article to increase an overall thickness of the thermoplastic composite article.

In other embodiments, the method comprises printing a pattern onto the first textured film layer after disposing the first textured film layer on the first surface of the heated, porous core layer.

In additional embodiments, the method comprises embossing the first textured film layer after disposing the first textured film layer on the first surface of the heated, porous core layer.

In some examples, the method comprises disposing a non-porous layer on the first surface of the heated, porous core layer prior to disposing the first textured film layer.

In another aspect, an in-line system configured to produce a thermoplastic composite article is described. In certain examples, the in-line system comprises a fluid reservoir configured to receive an aqueous solution, a thermoplastic material and reinforcing materials, wherein the fluid reservoir is configured to mix the thermoplastic material and the reinforcing materials in the aqueous solution to provide a homogeneous dispersion of the thermoplastic material and the reinforcing materials in the aqueous solution. The in-line system can also include a moving support fluidically coupled to the fluid reservoir and configured to receive the homogeneous dispersion from the fluid reservoir and retain the homogeneous dispersion on the moving support. If desired, the moving support can include two or more separate sections or segments. In some instances, the in-line system can also include a pressure device configured to remove water from the homogeneous dispersion on the moving support to provide a web comprising open cell structures formed from the reinforcing materials and the thermoplastic material. The in-line system can also include a device configured to dry and heat the web on the moving support to provide a porous core layer on the moving support. The in-line system can also include a first supply device configured to receive a first film material, wherein the first supply device is configured to provide the first film material as a first film layer onto a first surface of the porous core layer on the moving support. The in-line system can also include a consolidating device configured to consolidate the heated, porous core layer with the disposed first film layer by applying pressure to the heated, porous core layer and the disposed first film layer to provide a substantially planar thermoplastic composite article.

In certain embodiments, the first supply device is configured to receive a roll of the first film material.

In other embodiments, the in-line system can include a texturizing device configured to impart a texture to the first film layer prior to disposing the first film layer on the heated, porous core layer.

In some embodiments, the in-line system can include a texturizing device configured to impart a texture to the first film layer after disposing the first film layer on the heated, porous core layer.

In certain examples, the in-line system can also include a consolidating device.

In certain embodiments, the in-line system can include a second heating device positioned after the consolidating device, wherein the second heating device is configured to heat the thermoplastic composite article to increase an overall thickness of the thermoplastic composite after consolidation.

In certain examples, the in-line system can include a sprayer fluidically coupled to the fluid reservoir, wherein the sprayer is configured to spray the homogeneous dispersion onto the moving support.

In certain embodiments, the in-line system can include a second supply device configured to receive a supply or a non-porous material, wherein the second supply device is configured to provide the non-porous material as a non-porous layer onto the first surface of the porous core layer on the moving support prior to disposing the first film layer onto the heated, porous core layer.

In some embodiments, the in-line system can include a printer configured to print a pattern on the first film layer after the first film layer is disposed on the second surface of the heated, porous core layer.

In certain configurations, the in-line system can include an embosser configured to provide a pattern on the first film layer.

In some embodiments, the in-line system can include a processor configured to control movement of the moving support and optionally the other components of the in-line system.

In an additional aspect, a recreational vehicle (RV) ceiling comprises a first laminated lightweight reinforced thermoplastic composite article comprising a porous core layer, a first skin layer on a first surface of the porous core layer and a textured and patterned film layer on a second surface of the porous core layer. The RV ceiling may also comprise a support structure coupled to the first skin layer. For example, the support structure may comprise tubing or a network.

In certain embodiments, the RV ceiling comprises an exterior panel coupled to the support structure. In other embodiments, the exterior panel comprises fiberglass or aluminum.

In some embodiments, the RV ceiling comprises a foam layer coupled to the first skin layer and positioned between the first laminated lightweight reinforced thermoplastic composite article and the support structure.

In some embodiments, the textured and patterned film layer comprises a polyolefin film. For example, the polyolefin film can include one or more of polypropylene, polyethylene or blends or copolymers thereof.

In certain examples, the porous core layer in the first laminated lightweight reinforced thermoplastic composite article comprises a web comprising open cell structures formed from reinforcing fibers held together by a thermoplastic material. In other embodiments, the thermoplastic material in the porous core layer comprises a polyolefin. In some embodiments, the reinforcing materials in the porous core layer comprise glass fibers. In additional embodiments, the recreational ceiling panel is waterproof.

In another aspect, a recreational vehicle comprises a ceiling, side walls coupled to the roof, and a floor coupled to the sidewalls to provide an interior space within the recreational vehicle, wherein the ceiling of the recreational vehicle comprises a textured film layer as described herein. In some examples, the RV comprises wheels to permit towing of the recreational vehicle.

In an additional aspect, a waterproof panel comprises a first laminated lightweight reinforced thermoplastic composite article comprising a porous core layer, a first skin layer on a first surface of the porous core layer and a textured and patterned film layer on a second surface of the porous core layer, and a substrate coupled to the first laminated lightweight reinforced thermoplastic composite article through the first skin layer.

In certain embodiments, the waterproof panel meets a Class B standard as tested by ASTM E84 dated 2009. In other embodiments, the waterproof panel meets a Class A standard as tested by ASTM E84 dated 2009.

In some embodiments, the waterproof panel comprises a non-porous layer between the second surface of the porous core layer and the textured and patterned film layer.

In some examples, the textured and patterned film layer comprises microspikes on a surface of the film layer that couples to the first surface of the porous core layer to increase adhesion of the textured and patterned film layer to the first surface of the porous core layer.

In certain embodiments, the textured and patterned film layer comprises a basis weight between 80 gsm (g/m$^2$) and 250 gsm. In other embodiments, the textured and patterned film layer comprises more than a single film layer.

In some examples, the waterproof panel comprises a thermoset top coating on the textured and patterned film layer, e.g., a thermosetting material coating on the textured and patterned film layer.

In some embodiments, the waterproof panel is cellulose free.

In another aspect, a shower panel comprising a lightweight reinforced thermoplastic article comprising a textured film layer as described herein, e.g., the article comprises a porous core layer, a first skin layer on a first surface of the porous core layer and a textured and patterned film layer on a second surface of the porous core layer, and an optional substrate coupled to the first laminated lightweight reinforced thermoplastic composite article through the first skin layer.

In an additional aspect, a shower enclosure comprises a shower pan, a back wall coupled to the shower pan and sidewalls coupled to the shower pan and the backwall, wherein at least one of the shower pan, the backwall and the sidewalls comprises a lightweight reinforced thermoplastic article comprising a textured film layer as described herein, e.g., at least one of the sides, the backwall or the pan comprises a porous core layer, a first skin layer on a first surface of the porous core layer and a textured and patterned film layer on a second surface of the porous core layer, and an optional substrate coupled to the first laminated lightweight reinforced thermoplastic composite article through the first skin layer.

Additional aspects, configurations, embodiments and examples are described below.

BRIEF DESCRIPTION OF THE SEVERAL VIEWS OF THE DRAWINGS

Certain specific illustrations are described below to facilitate a better understanding of the technology described herein with reference to the accompanying drawings in which:

FIG. 10A, FIG. 10B, FIG. 10C, FIG. 10D, FIG. 10E, FIG. 10F, FIG. 10G, FIG. 10H, FIG. 10I, FIG. 10J, FIG. 10K, FIG. 10L, FIG. 10M, FIG. 10N and FIG. 10O show different patterns that can be present on a textured film layer, in accordance with some examples;

FIG. 16 is a table showing various films and materials present in tested LWRT articles;

FIG. 17A, FIG. 17B, FIG. 17C, FIG. 17D, FIG. 17E, FIG. 17F, FIG. 17G, FIG. 17H and FIG. 17I are illustrations showing different patterns and textures on film surfaces;

FIG. 18 is a table showing tested LWRT articles;

FIG. 19 is a table showing surface roughness measurements;

FIG. 20 is a table showing fire retardancy measurements; and

FIG. 21 and FIG. 22 are tables showing measured properties for the tested samples.

DETAILED DESCRIPTION

Figure 1:
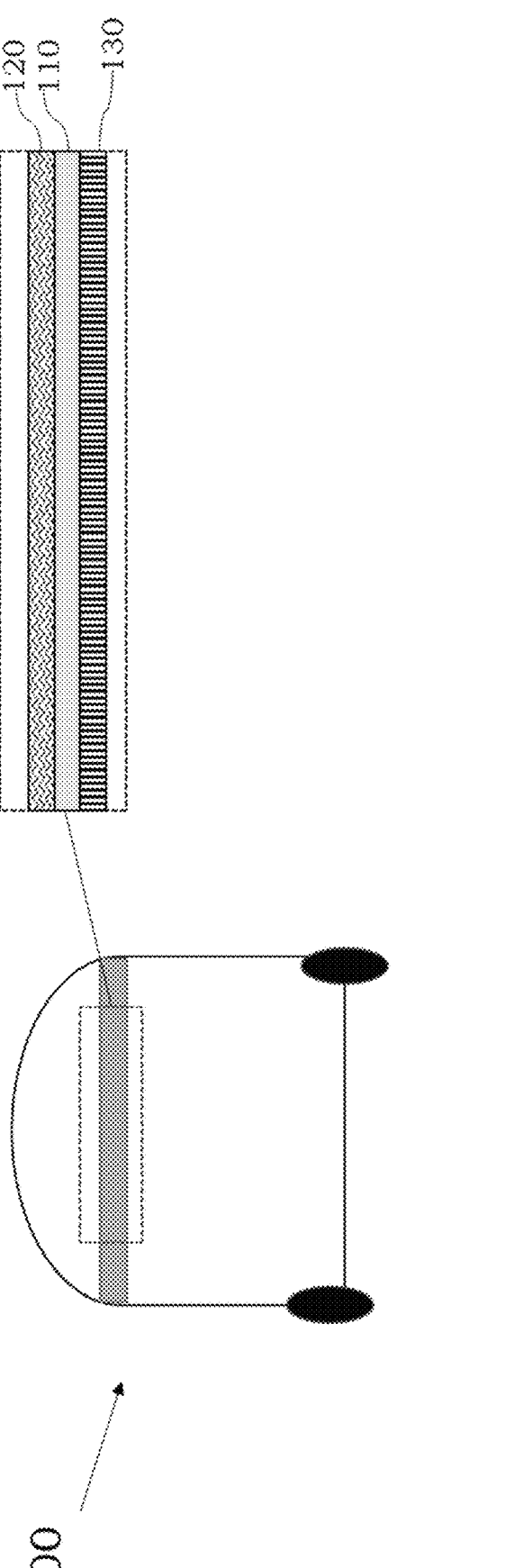
FIG. 1 is a simplified illustration showing a recreational vehicle ceiling, in accordance with some embodiments.

It will be recognized by the person of ordinary skill in the art, given the benefit of this description, that the different layers described herein are not necessarily shown to scale. No material is intended to be required in any one layer unless specifically indicated in the description in connection with that particular configuration. The thicknesses, arrangements and end-uses of the decorative panels may vary.

In certain embodiments, the processes described herein can be used to produce panels for use in building applications, vehicles such as recreational vehicles, in wet applications and for other uses. Recreational vehicles (RVs), including motorhomes and towables, can incorporate light weight glass fiber reinforced thermoplastic composite panels into a ceiling or other parts to reduce the weight. Compared with traditionally used wood composites, i.e. plywood, the polymeric composites provide abundant benefits, such as better durability, being free of formaldehyde, lighter weight for fuel efficiency, improved acoustic performance, water resistance or being waterproof, mold resistance, and flame retardancy, which benefits derive from the high degree of functional integration of glass and the thermoplastic resin matrix. In some configurations, reinforcing fibers, e.g., glass fibers, can advantageously impart to the modulus of elasticity of the resin matrix, resulting in property enforcement at a minimal weight increase. The performance of the resultant composite can depend, at least in part, on the core's formulation (fiber/resin ratio), weight per unit area (areal density), panel application thickness, and textured film layers.

In certain examples, an outer surface of the panel can include a textured film layer which is "deep" or has a high surface roughness. For example, a textured film can be bonded to an underlying web or core layer in an in-line process so it generally cannot be separated from the composite core. The resulting composite article can exhibit strong tensile strength, which eliminates the issue of décor/core delamination at the interfaces between layers within the RV ceiling construction. The textured film can also improve flexural stiffness of the board, especially in the machine direction. The textured panels can also pass ASTM E84 dated 2009 Class A flame retardancy classifications or ASTM E84 dated 2009 Class B flame retardancy classifications depending on the film used. The Class A classification generally means a flame spread index of –25 and a smoke development index of no larger than 450. The Class B classification generally means a flame spread index of 26-75 and a smoke development index of no greater than 450. In some embodiments, the textured film and other layers can provide a waterproof panel that can be used as a shower wall, shower pan or in other wet applications, e.g., as roofing or a roof panel. In some embodiments, a FMVSS 302 standard may also be used to measure fire or flame retardancy. The FMVSS 302 test is sometime referred to as a SAE J369 test standard. These tests are generally equivalent and are used to determine burning rate measurements. In brief, the tests use a horizontal flame chamber, a fume hood, a tote large enough to handle specimens of about 12 inches in length, a water source, a timer, a lighter and a ruler. The specimen size is about 4 inches by about 12 inches with 5 or more specimens typically being tested. The adhesive side of the specimen is typically subjected to the flame. For FMVSS 302 tests, the fume hood is typically opened enough to provide an air flow of about 150 cubic feet per minute. For the SAE J369 test, the fume hood, for example, may be opened to provide the same air flow or may be opened all the way. Unless otherwise noted herein, the FMVSS 302 test can be interchanged with the SAE J369 test. The results of these tests can be classified in several ways including DNI, SE/0, SE/NBR, SE/B, B, and RB. DNI refers to the material not supporting combustion during or following a 15 second ignition period and/or the material not transmitting a flame front across either surface to a selected distance. SE/0 refers to the material igniting on the surface, but the flame extinguishes itself before it moves a selected distance. SE/NBR refers to the material stopping burning before it has burned for 60 seconds from the start of timing and not burning more than about 50 mm from the point where timing was started. SE/B refers to the leading flame front progressing a selected distance but extinguishing itself before reaching a second distance. B refers to the material burning the entire distance. RB refers to the materials that burn so rapidly it is not possible to time the burning rate. One or more of burn distance, burn time, burn rate, and whether the material is self-extinguishing may also be measured. Specimens may be considered to "meet" or "pass" the FMVSS 302 or SAE J369 tests if the flame travels less than about 102 mm per minute. Specimens may fail the tests if they burn faster than 102 mm per minute.

In certain embodiments, the articles described herein can include a textured film on an outer surface. In some embodiments, the textured film may include a pattern, embossing or other features that generally provides some depth to the film and results in a rough surface. The overall basis weight of the film may vary from about 50 grams per square meter (gsm or $g/m^2$) to about 300 gsm, more particularly about 100 gsm to about 250 gsm. The film thickness may vary from about 0.1 mm to about 0.5 mm, more particularly, about 0.15 mm to about 0.30 mm. Surface roughness values can be used as a measure of the depth of the film. For example, a maximum height surface roughness (Rt) on at least one surface of the film can be 8 microns or more, 10 microns or more, 15 microns or more, or more than 20 microns in the machine direction and in the cross direction as measured by a stylus profilometer according to ISO 4287:1997. In other instances, the maximum height (Rt) may be more than 30 microns in the machine direction and in the cross direction as measured by a stylus profilometer according to ISO 4287:1997. In other embodiments, the maximum height (Rt) may be more than 40 microns in the machine direction and in the cross direction as measured by a stylus profilometer according to ISO 4287:1997. In certain embodiments, the maximum height (Rt) may be more than 50 microns in the machine direction and in the cross direction as measured by a stylus profilometer according to ISO 4287:1997. In some embodiments, the maximum height (Rt) may be more than 60 microns in the machine direction and in the cross direction as measured by a stylus profilometer according to ISO 4287:1997. In other embodiments, the maximum height (Rt) may be more than 70 microns in the machine direction and in the cross direction as measured by a stylus profilometer according to ISO 4287:1997. In some instances, microspikes (or other non-planar structures) on a surface of the film layer that couples to a first surface of a porous core layer can increase adhesion of the textured film layer to the first surface of the porous core layer.

In certain embodiments, the textured film side of the LWRT articles described herein may have a low or zero water absorption as tested by the Cobb test. Water absorption or retention is generally a measure of the mass of water absorbed over a specific time by a specific area of the LWRT article in contact with water. For example, water absorption can be measured by punching a disc of the material and clamping the punched disc with the textured film side facing up. The clamp can surround the top surface of the disc to form a cylindrical wall that can receive water. Water is then poured into the cylinder, and after waiting for 1 minute, the water is removed and the specimen is weighed to determine how much water was absorbed, e.g., to determine the weight gain percentage. If the surface layer is porous or not water-resistant, water can penetrate and saturate the specimen, which would result in a higher water retention or an increased weight gain percentage. In certain embodiments, the textured film side of the LWRT may have a water absorption of less than 1%, more particularly less than 0.5% or even 0%. As used herein, the percentages refer to the weight gain percentage after exposure to the water. For example, the textured film side of the LWRT article may be waterproof so no, or substantially no, water or moisture can penetrate into the surface. As noted in more detail below, the textured film layer can be used in combination with a non-porous layer or non-porous coating to further enhance the water resistance of the LWRT articles.

In some examples, the materials used in the film may vary and typically the films are produced using a polyolefin or combinations of polyolefins. For example, the films can include one or more of polyethylene, polypropylene, combinations of polyethylene and polypropylene and copolymers of polyethylene and polypropylene. In some embodiments, the textured film may be a homopolymer film, whereas in other embodiments the textured film can include two or more different polymers, e.g., include a copolymer film. If desired, different areas of the textured films could include different polymeric materials. The textured films can also include colorants, additives, fibers or other materials as desired.

In certain embodiments, the textured films may also include a pattern or embossing on a surface of the textured film. This pattern or embossing may be provided prior to disposing the film on a core layer or after disposing the film on a core layer. The patterns can be printed, embossed, etched, pressed or otherwise imparted to a surface of the textured film in many different manners. Illustrative patterns include, but are not limited to, a square pattern, a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a basket weave pattern, a diamond pattern, a chevron pattern, a French pattern, a fabric pattern, light colored patterns, dark colored patterns, coarse patterns or other patterns.

In other embodiments, the textured film can be used in combination with a top coat of material that is sprayed, coated or otherwise added to an outer surface of the textured film. While the top coat material may vary and includes thermoplastic materials and thermosetting materials, typical top coat materials include, but are not limited to, epoxy resins, acrylic resins, polyester resins, polycarbonate resins, melamine-formaldehyde resins, polyurethane resins and other thermosetting resins or thermoplastic resins. In some instances, the resins may comprise polymers cross-linked through the use of aminoplasts. Such resins are commercially available and illustrative resins/coatings are described, for example, in U.S. Patent Publication No. 20030055145. The exact thickness of the top coat can vary and is typically much thinner than the overall film thickness. The top coating is generally optically transparent, though it may be colored if desired. In some embodiments, the top coat may also provide some abrasion resistance according to according to ISO 9352:2012, Plastics—Determination of resistance to wear by abrasive wheels.

In some configurations, the textured film may also provide some chemical resistance. For example, the textured film may permit cleaning of a composite article including the textured film using conventional household cleaners, e.g. mild bleach, quaternary amines, alcohol, etc., without damage to the textured film, e.g., without removal of the texture and/or any color or design. In certain embodiments, light weight reinforced thermoplastic (LWRT) composites can be used as RV ceiling panels or as a RV ceiling. FIG. 1 shows one illustration where a RV 100 includes a ceiling panel that comprises a core layer 110, a textured film 130 and a skin layer 120. The textured film 130 generally faces an interior space of the RV 100, and the skin layer 120 can couple to other components of the RV 100 as noted in more detail below. The RV can include other layers or components. For example, RV sidewall constructions normally include the exterior wall material, a foam insulation (e.g., PET, EPS or a honeycomb foam), and the interior wall layer, all of which are laminated or bonded together, and then installed to a roof and a floor to provide strength to the overall unit. The roof or ceiling can include the panel shown in FIG. 1 that is bonded to one or more foam layers, structural components of the RV, etc. As noted below, the core layer 110 can include a porous web that is used in combination with a textured film layer and optionally additional skin layers. In conventional production methods, materials may be bonded onto a substrate (typically plywood) off-line and used in ceilings of RVs. However, in the past few years, concern about formaldehyde emissions, poor durability of plywood, and the high cost of the off-line lamination process by using polyurethane (PUR) glue to bond the materials onto plywood have stimulated the interest in developing a product by in-line laminating a textured film onto a durable composite panel. In-line laminated textured film composite panels can provide similar or better high-quality surfaces, gloss, and color, depending on the design/patterns, as compared to off-line laminated plywood panels.

Figure 2:
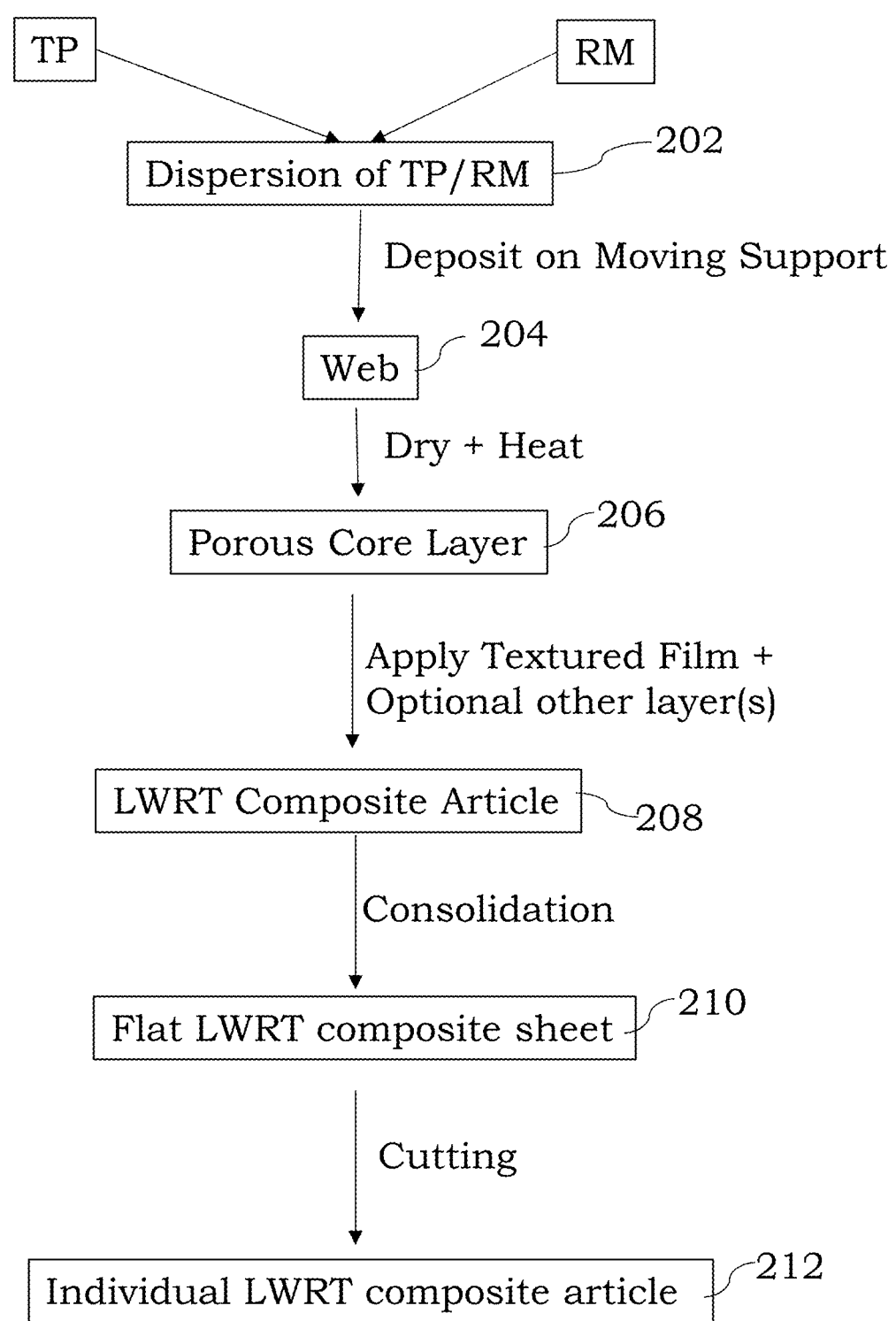
FIG. 2 is a block diagram showing certain steps of an in-line process that can be used, in accordance with some embodiments.

In certain embodiments, an in-line process to produce a panel with a textured film can include numerous steps which are typically controlled in an automated manner using a processor or computer as described in more detail below. Certain steps of the process, and the various materials used/produced by each step, are shown by way of the block diagram in FIG. 2. A LWRT layer is prepared by combining a thermoplastic material (TP), e.g., a thermoplastic resin, and reinforcing materials (RM) to form a dispersion or mixture 202. This mixture can then be deposited onto a suitable moving support to provide a web 204 formed by the reinforcing materials and the thermoplastic resin. The resulting web 204 can include open cell structures of reinforcing fibers held in place by the thermoplastic material. The resulting web 204 can be heated and dried to soften or melt the thermoplastic resin and form a porous core layer 206. One or more layers, e.g., a textured film layer, can then be applied to a surface of the formed and heated porous core layer 206. For example, a textured film layer can be applied to form a LWRT composite article 208. While not shown, a non-permeable layer or coating may be applied between the core layer 206 and the textured film to further render the assembly water resistant or water proof. The resulting LWRT composite can be consolidated into a flat sheet 210, which can be used in forming the RV ceiling or other composite panel. For example, the flat sheet 210 on a moving support can be cut to provide an individual LWRT composite article 212. Various illustrations of process conditions, steps and materials are described in more detail below.

Figure 3:
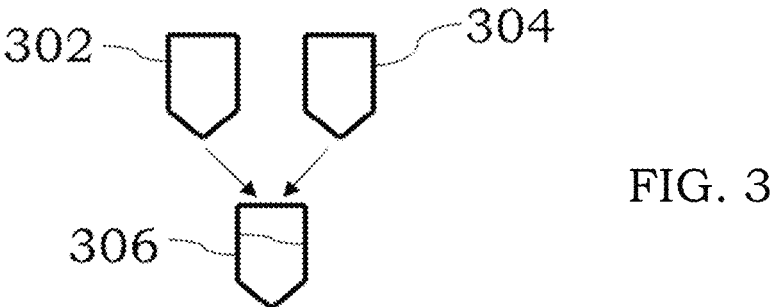
FIG. 3 is an illustration showing certain components that can be used to add materials into a mixing tank, in accordance with certain examples.

As shown in FIG. 3, a thermoplastic material can be present in a reservoir 302 and reinforcing fibers (or other reinforcing materials) can be present in a second reservoir 304. Each of the thermoplastic material and the reinforcing fibers can be metered, sprayed, or otherwise introduced into an aqueous solution in a mixing tank 306 comprising water, a liquid or an aqueous solution. If desired, a foam or other additives (as discussed below) may be present in the mixing tank 306. The thermoplastic material and reinforcing fibers can be mixed for a suitable time and at a suitable temperature to provide a substantially homogenous aqueous dispersion of the fibers and the thermoplastic material. For example, the materials may be mixed at room temperature, e.g., about 25 deg. Celsius, or above room temperature or below room temperature by heating or cooling the mixing tank. In some embodiments, the materials can be added continuously into the mixing tank 306 to permit continuous deposition of the dispersion onto a moving support as noted below. While the exact mixing time may vary depending on the materials used, illustrative mixing times include 10 seconds to about 10 minutes, more particularly about 30 seconds to about 5 minutes. As noted above, however, in instances where the materials are continuously added to the mixing tank 306, mixing is performed constantly. The mixing tank 306 can include a paddle mixer, an impeller or other devices to facilitate mixing.

Figure 4A:
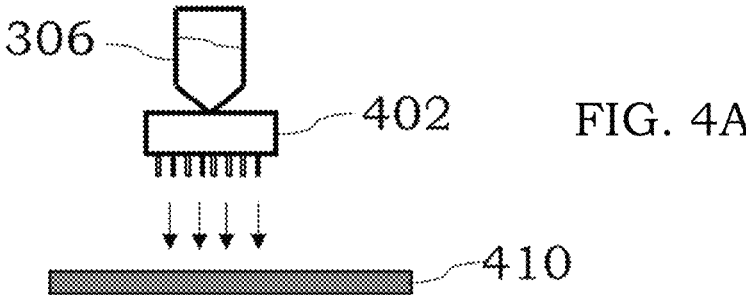
FIG. 4A and FIG. 4B are illustrations of a moving support, in accordance with some embodiments.
Figure 4B:
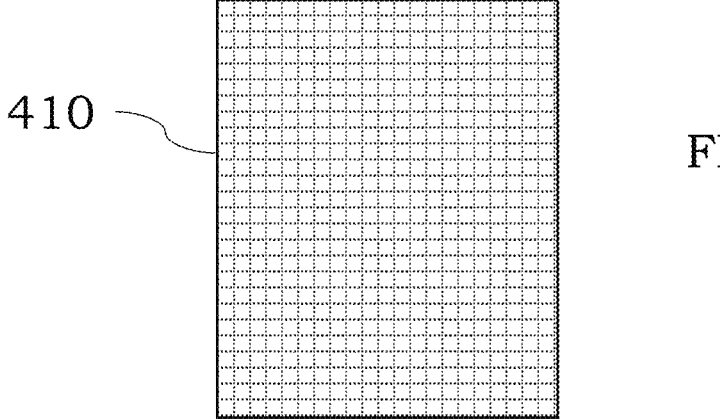

In certain embodiments and referring to FIG. 4A, the dispersion in the mixing tank 306 can be sprayed, dripped or otherwise deposited onto a moving support 410. While the moving support 410 is shown as a single segment in certain figures depicted herein, the moving support 410 could be broken up into two or more individual segments as desired. The mixing tank 306 can be fluidically coupled to a plurality of spray heads 402 that can spray the dispersion onto a surface of the moving support 410. As shown in FIG. 4B, the moving support 410 can be porous or include a mesh that can receive the dispersion. The exact deposition rate used may vary depending on the amount of material to be deposited per square meter. The moving support 410 may move at a continuous and constant speed to permit continuous spraying of the dispersion along a top surface of the moving support 410. The area of the moving support 410 under the spray heads may be heated, cooled or present at room temperature during deposition of the dispersion. As noted below, different areas of the moving support 410 may have different temperatures. The exact dimensions of the moving support 410 can vary and typically the moving support is about 4 feet wide and can include a mesh or pore size of about 60 openings/square inch to about 80 openings/square inch of moving support 410. The moving support 410 permits receipt of the dispersion and movement of the received dispersion to additional sites or stations of the in-line system. At the end of the moving support 410, the formed LWRT articles can be cut and stacked. The moving support 410 permits continuous formation of LWRT articles.

In certain embodiments, the moving support 410 can be split into two or more separate sections or segments. For example, a wet mat can be formed on a former belt and then transferred, e.g., manually or automatically, onto a separate dryer belt where it can pass through an oven or other drying device.

Figure 5A:
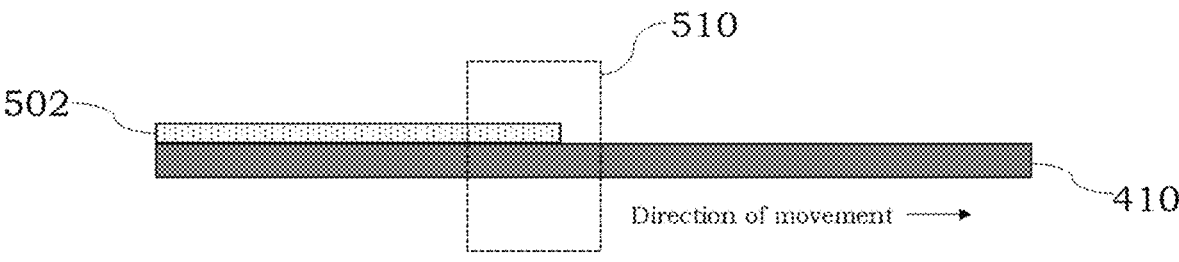
FIG. 5A, FIG. 5B and FIG. 5C are illustrations showing a drying device, in accordance with certain embodiments.
Figure 5B:
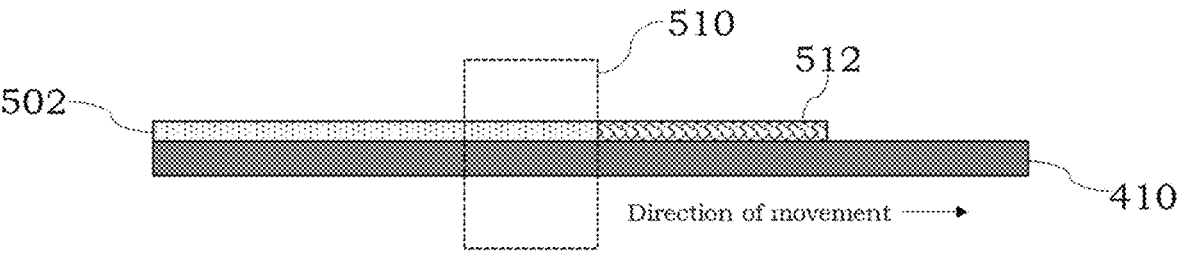
Figure 5C:
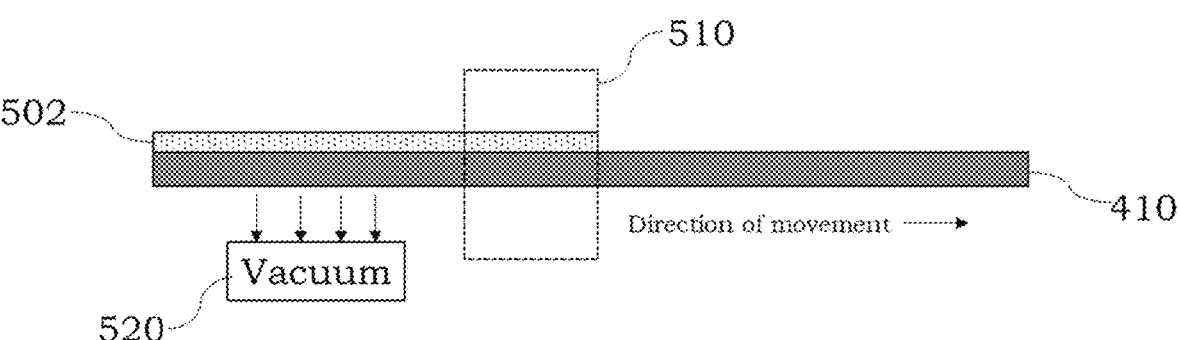

In certain embodiments and referring to FIG. 5A, the moving support 410 with the dispersion of the thermoplastic material and reinforcing fibers can migrate to a drying device 510. Alternatively as noted above, the drying device 510 may be positioned adjacent to a separate dryer belt that can receive the formed mat. The drying device 510 can provide heat and/or a negative pressure (vacuum) to remove the water from the web 502 on the moving support 410 and leave behind the reinforcing fibers and the thermoplastic material on the moving support 410. This process can form a core layer 512 (see FIG. 5B) with a high porosity that includes open cell structures formed from the reinforcing fibers that are held in place by the thermoplastic material. If desired, other materials may also be present in the core layer or sprayed onto the core layer 512. For example, an adhesive from a reservoir can be sprayed on a surface of the formed core layer 512. In other instances, a coating may be sprayed on the core layer 512 to act as a non-porous layer and enhance the waterproof nature of the final LWRT article. The exact temperature used to heat the web 502 and/or core layer 512 may vary and desirably the temperature is above a melting point of the thermoplastic material and below a melting point of the reinforcing fibers. In some examples, the moving support 410 itself can be heated, whereas in other examples the drying device 510 can include a heating element or be configured as an oven or other heating devices. While not shown, heated or cooled air can be blown across a top surface of the web 502 or the core 512. If desired, the drying device 510 and the moving support 410 can both provide heat to the web 502 on the moving support 410. In some instances, the moving support 410 can include a thermally conductive material that can retain the heat from the drying device 510 to assist in maintaining the core layer 512 in a softened form during application of textured film layer or other materials. In some examples, a pressure device 520 separate from the drying device 510 may be present (see FIG. 5C). For example, a vacuum may be applied to the web 502 to remove water from the web 502 and leave behind the reinforcing materials and the thermoplastic material. The pressure device 520 is typically upstream of the drying device 510 and is designed to remove at least 40% by volume of the water from the web 502, more particularly about 60% by volume of the water from the web 502. If desired, another pressure device (not shown) can be downstream of the pressure device 520 or downstream of the drying device 510.

Figure 6A:
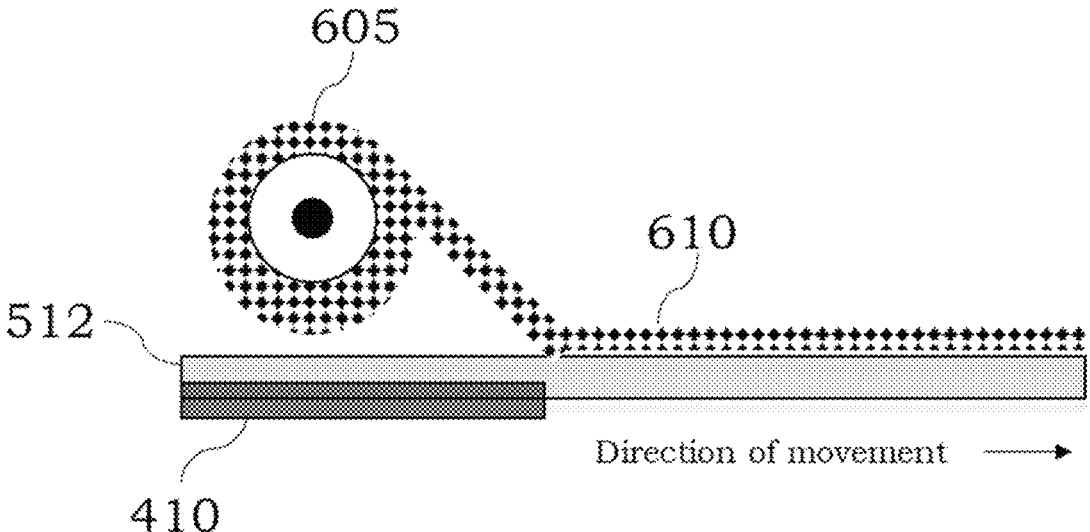
FIG. 6A and FIG. 6B are illustrations showing application of a textured film layer and/or skin layer to a core layer, in accordance with certain embodiments.

In certain embodiments, as the core layer 512 exits the drying device 510, one or more skin layers can be applied to a surface of the core layer in an automated manner. As noted herein, an outer skin layer typically takes the form of a textured film to impart some surface roughness and/or a pattern, embossing, etc. to the outer surface of the LWRT article. Referring to FIG. 6A, an illustration is shown where a textured film layer 610 is applied to a core layer 512 as the core layer 512 exits the moving support 410. For example, the textured film layer 610 may be present as a roll of film layer material 605 that is unrolled and applied in a continuous manner to one surface of the core layer 512. While not shown in FIG. 6A, the textured film layer material 605 can be stretched or elongated prior to applying the film layer 610 to the surface of the core layer 512. In some examples, the textured film layer material 605 can be stretched in the machine direction, e.g., in the direction of movement of the moving support, or can be stretched in a cross-direction, e.g., in a direction perpendicular to the machine direction. While the degree of stretching depends on the particular materials present in the textured film layer material 605, in some embodiments, the film may be stretched by applying a stretching force of about 60 N to about 250 N to stretch the film layer material 605. The exact force that is applied may vary with thicker films typically using higher forces to stretch the film. Where a stretching force is applied, the stretching force is selected to be less than an elongation at break force so the film does not tear during the stretching. If desired, the film layer material 605 can be stretched between multiple rollers prior to application to the core layer 512. The textured film layer 610 can be applied at room temperature even though the core layer 512 still may be heated or otherwise present on the moving support 410 above room temperature.

In some embodiments, the final LWRT article includes a textured film layer 610 on a surface of the core layer 512. A non-porous layer or a non-porous material may be present between the surface of the core layer 512 and the textured film layer 610. For example, the porosity of the non-porous layer may be less than 5% or even less than 1% or 0% to provide a LWRT article that is essentially waterproof and can be used in wet environments such as, for example, shower walls, shower receptacles, RV shower walls, roofing panels, exterior panels or siding or other building and vehicle applications where the article may be exposed to water.

Figure 6B:
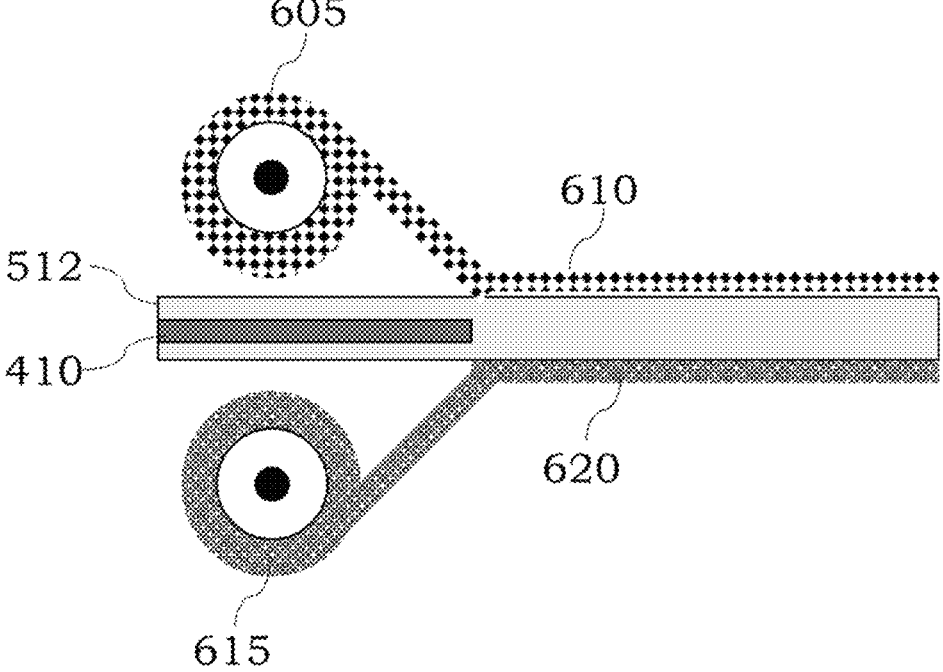

In certain embodiments as shown in FIG. 6B, a second skin layer 620 can be applied to a second surface of the core layer 512 from a second roll 615 including the second skin material. The skin layer 620 can be applied at room temperature even though the core layer 512 still may be heated otherwise be present on the moving support 410 above room temperature. Alternatively, the rolls 605, 615 or layers 610, 620, or both, can be heated prior to being applied to the surfaces of the core layer 512. The layers 610, 620 can generally be applied in a continuous manner to form a thermoplastic composite article that includes the core layer 512, a textured film layer 610 and optionally a second skin layer 620. While not shown, additional skin layers can be applied on top of the skin layer 620 using a similar process, while the textured film layer 610 tends to be the outer layer of the LWRT article that faces the use environment. If desired, however, another layer, e.g., a second textured film layer, could be applied on top of the textured film layer 610.

Figure 7:
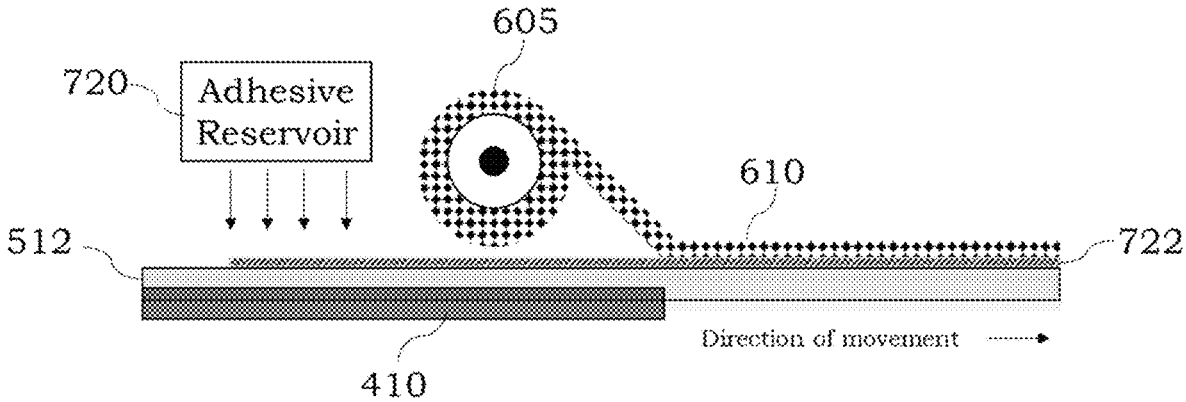
FIG. 7 is an illustration showing an adhesive layer reservoir that can be used to apply an adhesive to a surface of a core layer, in accordance with some examples.

In some embodiments, it may be desirable to apply an adhesive layer on the core layer 512 prior to applying the layer 610 to the core layer 512. In such instances, an adhesive reservoir 720 (See FIG. 7) can be present and used to spray adhesive on a surface of the core layer 512 prior to application of the film layer 610, so an adhesive layer 722 is present on the surface of the core layer 512. The exact adhesive used may vary from thermoplastic adhesives, thermosetting adhesives or combinations thereof. While not shown, an adhesive can also be applied to an opposite surface of the core layer 512 prior to application of the skin layer 620 to the core layer 512. Illustrative adhesives include polyolefin adhesives, polyurethane adhesives and combinations thereof.

Figure 8A:
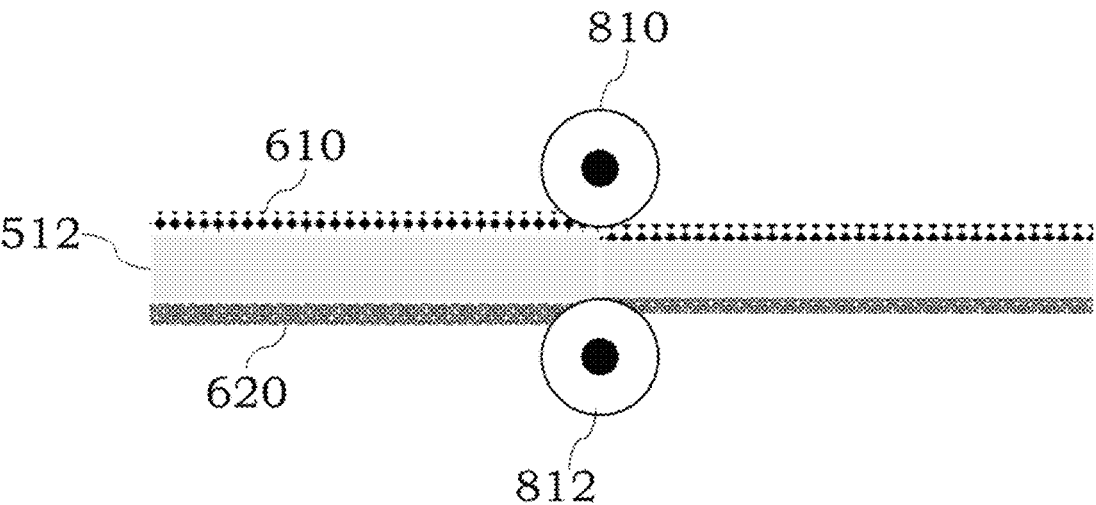
FIG. 8A and FIG. 8B are illustrations showing rollers that can be used in an in-line process, in accordance with some examples.

In certain embodiments, the resulting thermoplastic composite article can be consolidated by applying pressure to the surfaces of the composite article. For example and referring to FIG. 8A, the composite article may pass between rollers

Figure 8B:
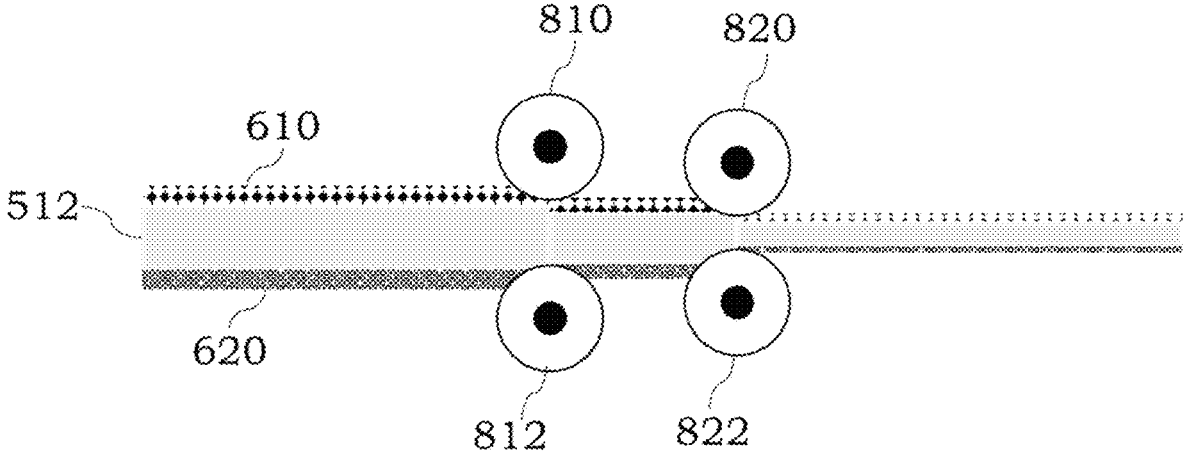

810, 812 to compress the composite article and enhance bonding of the layer(s) 610, 620 to the core layer 512. The exact distance or gap between the rollers 810, 812 may vary depending on the desired pressure to be applied and depending on a desired final thickness for the composite article. In general, an overall thickness of the composite article decreases after passing through the rollers 810, 812. The rollers 810, 812 can be operated at room temperature, above room temperature or below room temperature. Further, the roller 810 can be held at a lower or higher temperature than a temperature of the roller 812. For example, it may be desirable to heat the roller 810 to enhance bonding of the film layer 610 to a surface of the core layer 512 while cooling the roller 812 to maintain the core layer 512 in a more hardened or solid form. If desired, more than a single set of rollers 810, 812 can be present. For example and referring to FIG. 8B, a second set of rollers 820, 822 are shown. The gap between the different sets of rollers may be different. For example, a first set of rollers 810, 812 may include a first gap that is less than a gap between the rollers 820, 822. The gap between the various rollers may be fixed or may vary. For example, it may be desirable to compress certain areas of the composite article to a greater degree so the thickness at these compressed areas is lower. In some instances, edges of the composite article can be compressed more so a thickness at the side edges of the composite article is lower. Three, four or more sets of rollers may be present if desired. The rollers can be positioned within an oven or heating device, if desired, to maintain the core layer in a softened form during consolidation of the composite article. Alternatively, the temperature of each individual roller can be independently controlled to provide heat or cooling to a particular surface of the article.

Figure 9:
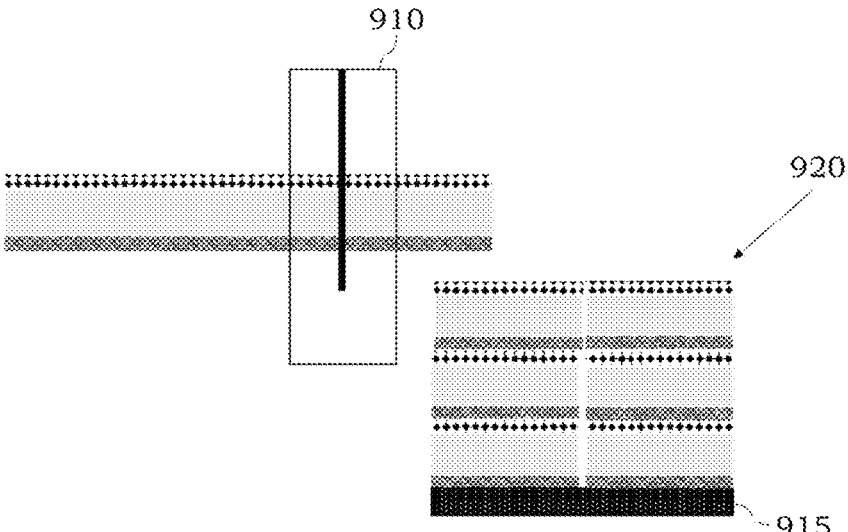
FIG. 9 is an illustration showing a cutting device that can be used to cut the moving composite article into individual composite articles, in accordance with certain embodiments.

In certain embodiments, once the composite article is consolidated, the continuous sheet of consolidated composite article can be cut or guillotined into individual sheets using a cutting device 910 (see FIG. 9). The resulting individual composite articles can be stacked or palletized, e.g., on pallet 915, for shipping as shown in the stack 920. The dimensions of the composite article in FIG. 9 have been intentionally enlarged to show the stacking, since the composite articles tend to be stacked as individual thin sheets with a thickness, for example, from 1 mm to about 30 mm. The exact size of the individual composite articles may vary from about 2 feet wide to about 8 feet wide and about 4 feet long to about 16 feet long. In some embodiments, the individual composite article may be about 4 feet wide and about 8 feet long so it has similar dimensions to plywood panels commonly used in recreational vehicles and building applications.

In certain configurations, the core layer that is produced using the in-line process can include reinforcing fibers in combination with a thermoplastic resin. For example, the core layer can be formed from a random arrangement of reinforcing fibers that are held in place by the thermoplastic resin material. For example, the core layer typically comprises a substantial amount of open cell structure such that void space is present in the layers. In some instances, the porous core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges.

In certain embodiments, the thermoplastic material used to form the core layers described herein may include one or more of a polyolefin (e.g., one or more of polyethylene, polypropylene, etc.), polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the core layer can be used in powder form, resin form, rosin form, particle form, fiber form or other suitable forms. Illustrative thermoplastic materials in various forms are described herein and are also described, for example in U.S. Publication Nos. 20130244528 and US20120065283. The exact amount of thermoplastic material present in the core layer can vary and illustrative amounts range from about 20% by weight to about 80% by weight, e.g., 30-70 percent by weight or 35-65 percent by weight, based on the total weight of the core layer. It will be recognized by the skilled person that the weight percentages of all materials used in the core layer will add to 100 weight percent.

In other embodiments, the reinforcing fibers of the core layers may comprise glass fibers, carbon fibers, graphite fibers, synthetic organic fibers, particularly high modulus organic fibers such as, for example, para- and meta-aramid fibers, nylon fibers, polyester fibers, a high melt flow index resin (e.g., 100 g/10 min. MFI or above) that is suitable for use as fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In certain embodiments, the fibers used may be cellulose free to avoid or reduce the likelihood of mold or other microbial growth. In some embodiments, the fibers in the core can be bi-component fibers, e.g., core-sheath fibers, as described for example, in U.S. Patent Publication No. 20180162107 published on Jun. 14, 2018. In some embodiments, any of the aforementioned fibers can be chemically treated prior to use to provide desired functional groups or to impart other physical properties to the fibers, e.g., may be chemically treated so that they can react with the thermoplastic material, the lofting agent or both. The fiber content in the core layer may vary from about 20% to about 90% by weight of the core layer, more particularly from about 30% to about 70%, by weight of the core layer. The particular size and/or orientation of the fibers used may depend, at least in part, on the thermoplastic material used and/or the desired properties of the core layer. For example, the fibers can be randomly oriented or may have a specific selected orientation as desired. In one non-limiting illustration, fibers dispersed within a thermoplastic material and optionally other additives to provide the core layers can generally have a diameter of greater than about 5 microns, more particularly from about 5 microns to about 22 microns, and a length of from about 5 mm to about 200 mm, more particularly, the fiber diameter may be from about 2 microns to about 22 microns and the fiber length may be from about 5 mm to about 75 mm.

In certain embodiments, other additives may also be present in the mixture comprising the thermoplastic resin and the reinforcing fibers. For example, a lofting agent, flame retardants, colorants, smoke suppressants, surfactants, foams or other materials may be present. In some examples, the core layer may substantially halogen free or halogen free core layer to meet the restrictions on hazardous substances requirements for certain applications. In other instances, the core layer may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the core layers may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the core layer), more particularly about 1 weight percent to about 13 weight percent, e.g., about 5 weight percent to about 13 weight percent based on the weight of the core layer. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the core layer. If desired, two different substantially halogen free flame retardants may be added to one or more of the core layers described herein. In certain instances, one or more of the core layers described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the core layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (MDH) and aluminum hydroxide (ATH).

In certain embodiments, the skin layers 610, 620 may be the same or may be different. For example, each of the layers 610, 620 could be a textured film layer or one of the layer 610, 620 can be a textured film layer and the other layer may be a material or layer other than a textured film layer. In one instance, the skin layer 610 is a decorative, embossed or patterned film layer and the skin layer 620 can be a decorative or patterned layer or other types of skin layers. Where one or both of the skin layers 610, 620 includes a pattern, the pattern may be the same or different at different areas of the skin layer. In some embodiments, a textured film layer or a skin layer may comprise a pattern that is one or more of a woodgrain pattern (FIG. 10A), a marble pattern (FIG. 10B), a tile pattern (FIG. 10C), a random pattern (FIG. 10D), a pinwheel pattern (FIG. 10E), a herringbone pattern (FIG. 10F), a brick pattern (FIG. 10G), an offset staggered brick pattern (FIG. 10H), an offset pattern (FIG. 10I), a grid pattern (FIG. 10J), a stacked vertical pattern (FIG. 10K), a basket weave pattern (FIG. 10L), a diamond pattern (FIG. 10M), a chevron pattern (FIG. 10N) or a French pattern (FIG. 10O). Other patterns are also possible. In some embodiments, the pattern may already be present on the textured film layer or skin layer material when it is on the roll 605 or the roll 615. In other instances, a pattern can be printed or embossed onto a film layer or a skin layer prior to applying the film layer or the skin layer to the core layer. An illustration of a system that can include a printer to print a pattern on a skin layer is described in more detail below. Where one of the layers 610, 620 includes a pattern or embossing, the other layer may be, for example, a thermoplastic film, a polyolefin film, an elastomer film, a scrim, a frim, a web, etc. In certain configurations, where the other layer takes the form of a thermoplastic film, the thermoplastic film comprises at least one of a polyolefin, e.g., polyethylene or polypropylene, at least one poly(ether imide), at least one poly(ether ketone), at least one poly(ether-ether ketone), at least one poly(phenylene sulfide), poly(arylene sulfone), at least one poly(ether sulfone), at least one poly (amide-imide), poly(1,4-phenylene), at least one polycarbonate, at least one nylon, and at least one silicone. In other examples, the other layer may be, for example, a frim (film+scrim), a scrim (e.g., fiber based scrim), a foil, a woven fabric, a non-woven fabric or be present as an inorganic coating, an organic coating, or a thermoset coating. In other instances, the other skin layer may comprise a limiting oxygen index greater than about 22, as measured per ISO 4589 dated 1996. Where a fiber based scrim is present as (or as part of) the other skin layer, the fiber based scrim may comprise at least one of glass fibers, aramid fibers, graphite fibers, carbon fibers, inorganic mineral fibers, metal fibers, metalized synthetic fibers, and metalized inorganic fibers. If desired, the scrim may comprise materials or fibers produced from one or more of the thermoplastic materials described above in connection with the core layers. Where a thermoset coating is present as (or as part of) the other skin layer, the coating may comprise at least one of unsaturated polyurethanes, vinyl esters, phenolics and epoxies. Where an inorganic coating is present as (or as part of) the other skin layer, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the other skin layer, the non-woven fabric may comprise a thermoplastic material, a thermal setting binder, inorganic fibers, metal fibers, metallized inorganic fibers and metallized synthetic fibers. If desired, the other skin layer may also comprise a lofting agent, an expandable graphite material, a flame retardant material, fibers, etc. As noted herein, where the LWRT article is intended to be used in wet applications, it may be desirable to select the other skin layer to be cellulose free to avoid microbial growth.

In certain embodiments, the composite articles described herein may have desired surface properties on at least one surface. For example, the core layer of the articles described herein may have some inherent roughness due to the presence of the reinforcing fibers. This roughness can be increased by selecting suitable fibers with a suitable length. The underlying roughness of the core layer can be used in combination with a surface roughness of the textured film layer to impart an overall roughness to the surface of the LWRT article. While surface roughness can be measured in numerous ways, three roughness parameters, mean arithmetic deviation of profile (Ra), root-mean-square average of the profile heights (Rq), and maximum height (Rt) can be used as a measure of surface roughness. Ra is the average distance from the profile to the mean line over the length of assessment, Rq is the root-mean-square average of the profile heights over the evaluation length, and Rt is the vertical distance between the highest and lowest points of the profile within the evaluation length. See, for example, L. Mummery (1990). Surface texture analysis: the handbook. Hommelwerke, p. 106. Surface roughness can be measured using a stylus profilometer and generally complies with the following standards: JIS (JIS-B0601-2001, JIS-B0601-1994, JIS B0601-1982), VDA, ISO 4287:1997, and ANSI. The parameters (Ra, Rq, Rz, and Rt) can be characterized by ISO 4287:1997.

In certain embodiments, surface roughness (Ra) on at least one surface of the LWRT composite article, e.g., the surface comprising the patterned layer, can be more than 7 microns in the machine direction and in the cross direction as measured by a stylus profilometer according to ISO 4287:1997. In other embodiments, a surface roughness (Ra), of a surface comprising the textured film layer, of the thermoplastic composite article is more than 10 microns in the machine direction and in the cross direction as measured by a stylus profilometer according to ISO 4287:1997. In other examples, an average RMS profile height (Rq) of at least one surface of the composite article, e.g., the surface comprising the textured film layer, can be more than 1 micron in the machine direction and in the cross direction as measured by a stylus profilometer according to ISO 4287: 1997. In other embodiments, an average RMS profile height (Rq), of a surface comprising the textured film layer, of the thermoplastic composite article is more than 12 microns in the machine direction and in the cross direction as measured by a stylus profilometer according to ISO 4287:1997. In other examples, a maximum height (Rt) on at least one surface of the composite article, e.g., the surface comprising the textured film layer, can be more than 10 microns or more than 20 microns in the machine direction and in the cross direction as measured by a stylus profilometer according to ISO 4287:1997. In other embodiments, a maximum height (Rt), of a surface comprising the textured film layer, of the thermoplastic composite article is more than 30 microns or more than 40 microns in the machine direction and in the cross direction as measured by a stylus profilometer according to ISO 4287:1997.

Figure 11A:
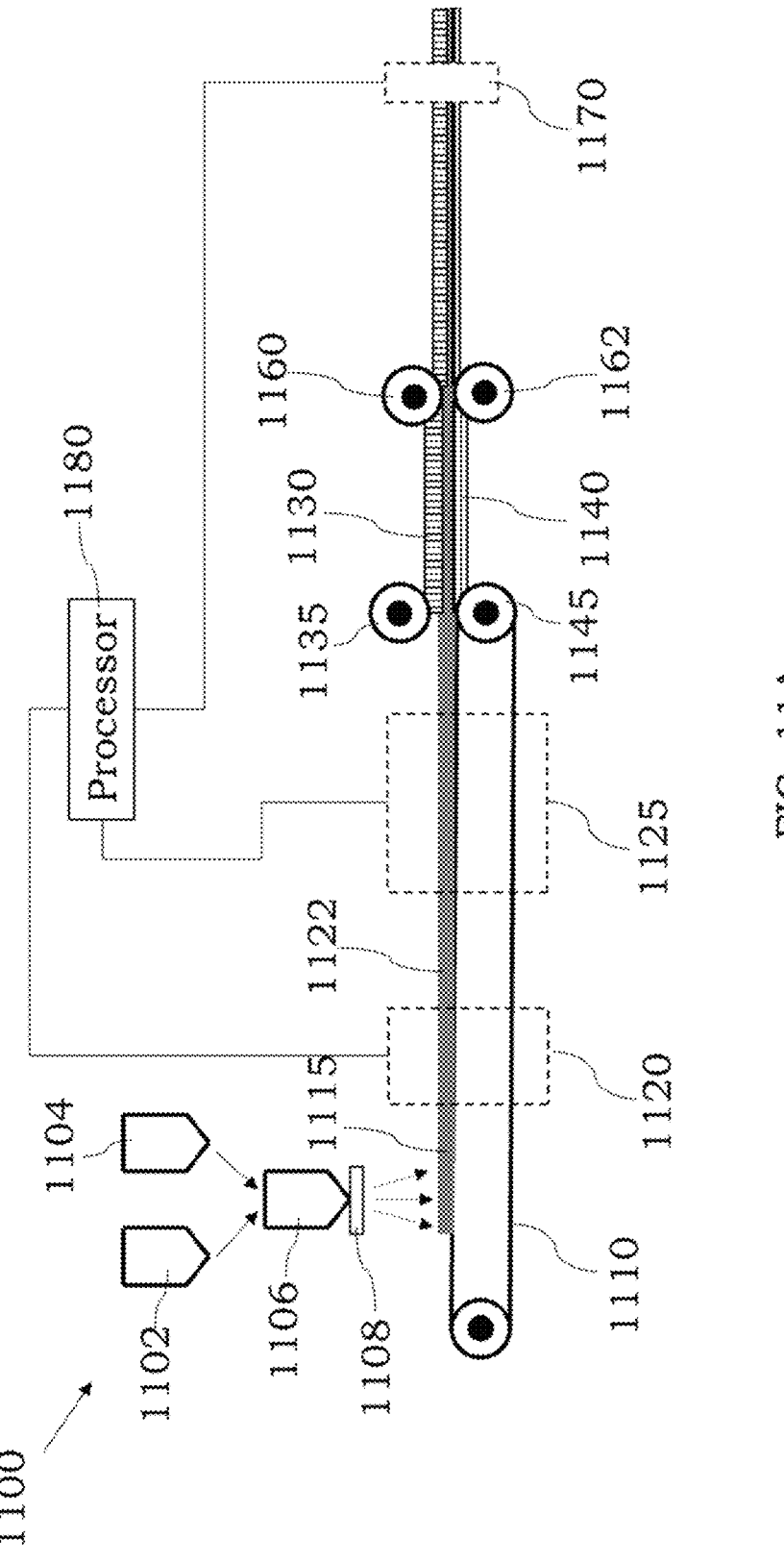
FIG. 11A, FIG. 11B, FIG. 11C and FIG. 11D are illustrations of systems that can be used to perform the in-line process, in accordance with certain embodiments.

In certain configurations, a system can be used to implement the in-line process. An illustration of components of the system are shown in FIG. 11A. The system 1100 includes reservoirs 1102, 1104. Reservoir 1102 can receive a thermoplastic material, and reservoir 1104 can receive reinforcing fibers. The reservoirs 1102, 1104 can provide materials to a mixing tank 1106. The mixing tank 1106 can be fluidically coupled to a spray head or nozzles 1108 to spray the mixed dispersion onto a moving support 1110. The web 1115 on the moving support 1110 can travel through a vacuum or other pressure device 1120, which can remove the liquid from the web 1115 to form a core layer 1122. The core layer 1122 can pass through a drying device 1125 to dry and heat the core layer. A textured film layer 1130 and a skin layer 1140 can be applied from supply devices or rolls 1135, 1145 respectively onto opposite surfaces of the core layer 1122 to provide a composite article. The composite article can pass through set of rollers 1160, 1162 to consolidate the composite article. The consolidated composite article can be cut into individual articles by cutting device 1170 as the sheet of moving, consolidated thermoplastic composite article passes through the cutting device 1170. A processor 1180 is shown that can control, for example, movement of the moving support 1110, spraying of the material onto the moving support 1110, and other devices and parameters used by the system 1100.

Figure 11B:
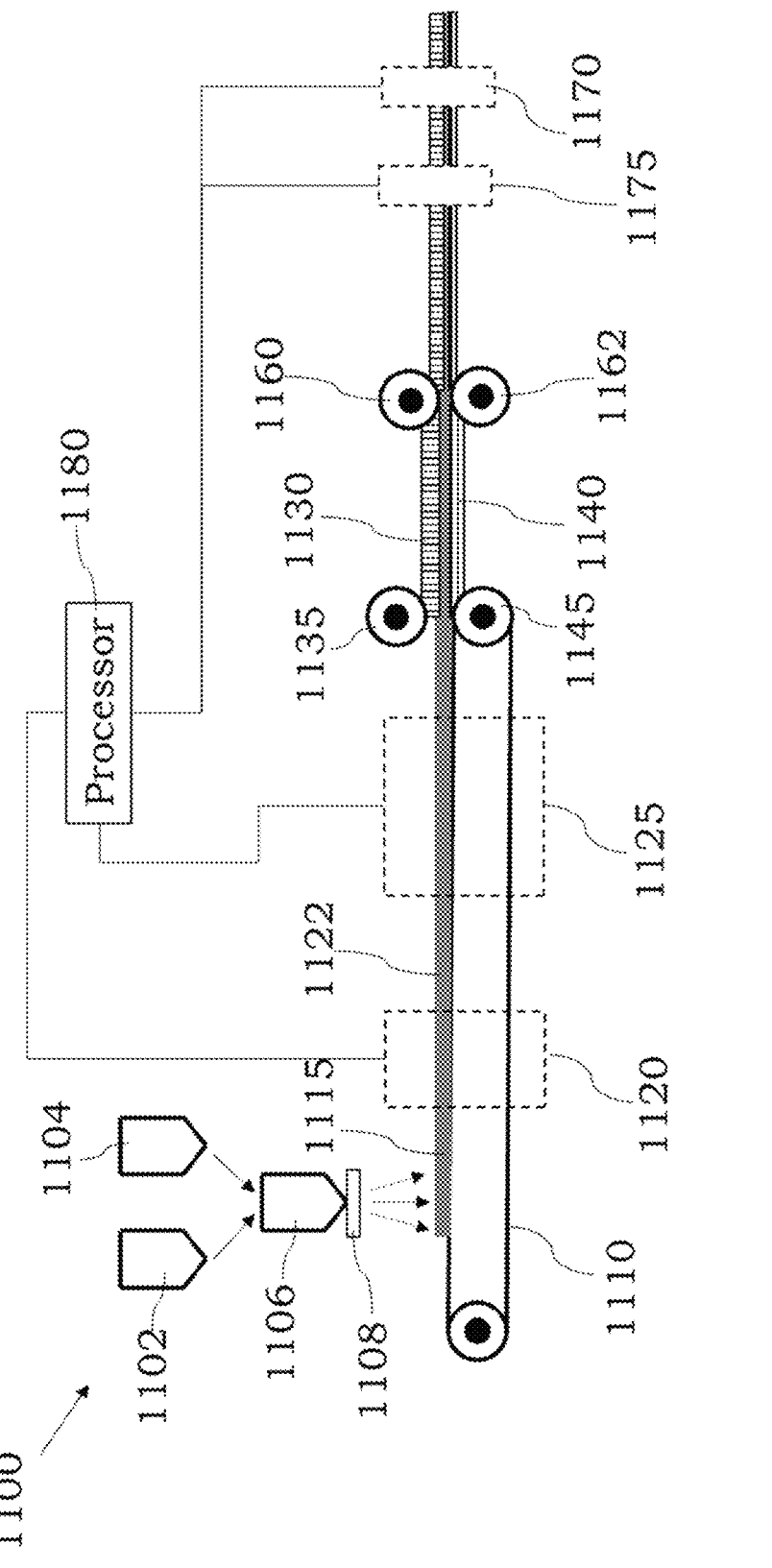
Figure 11C:
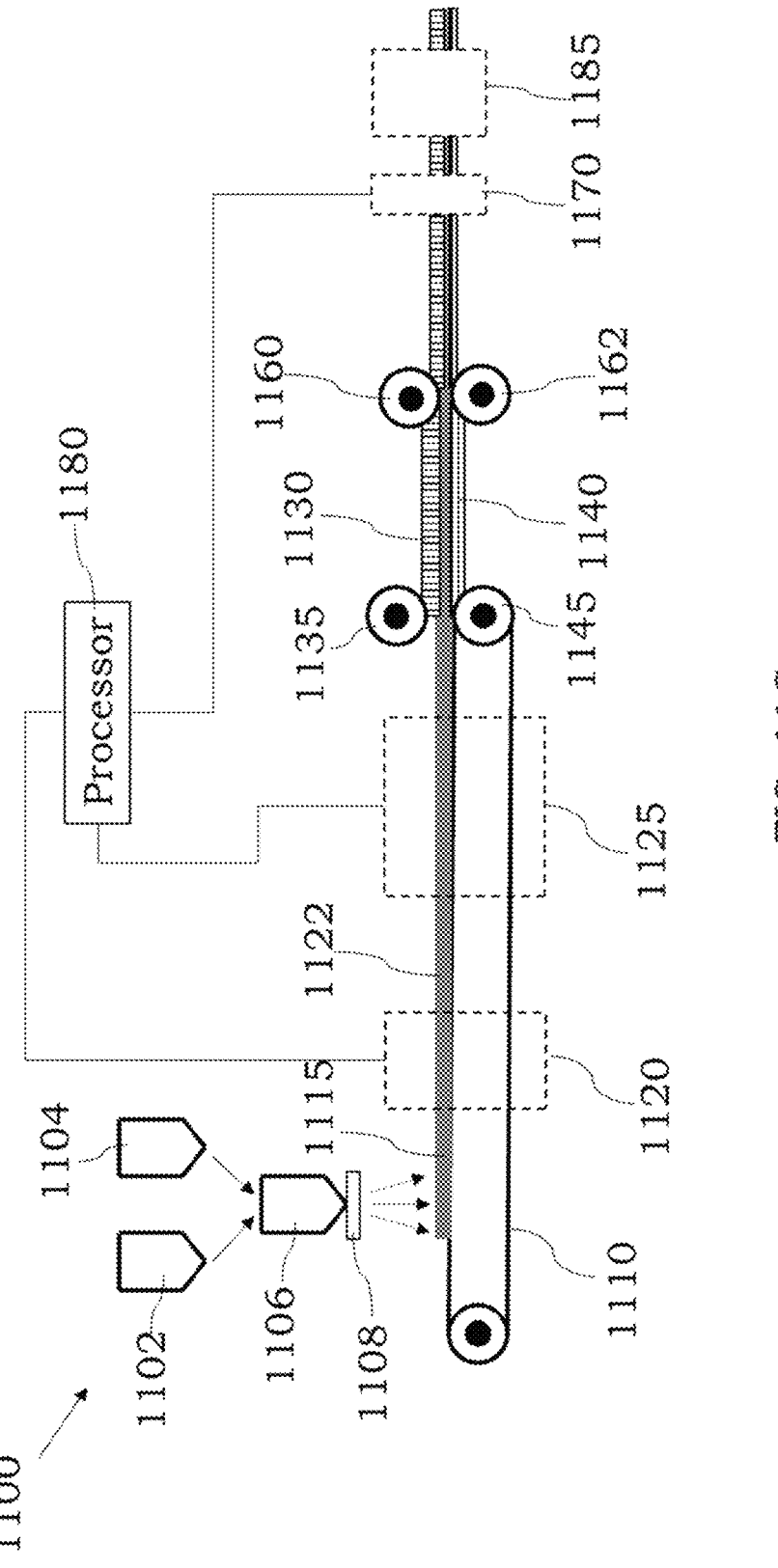
Figure 11D:
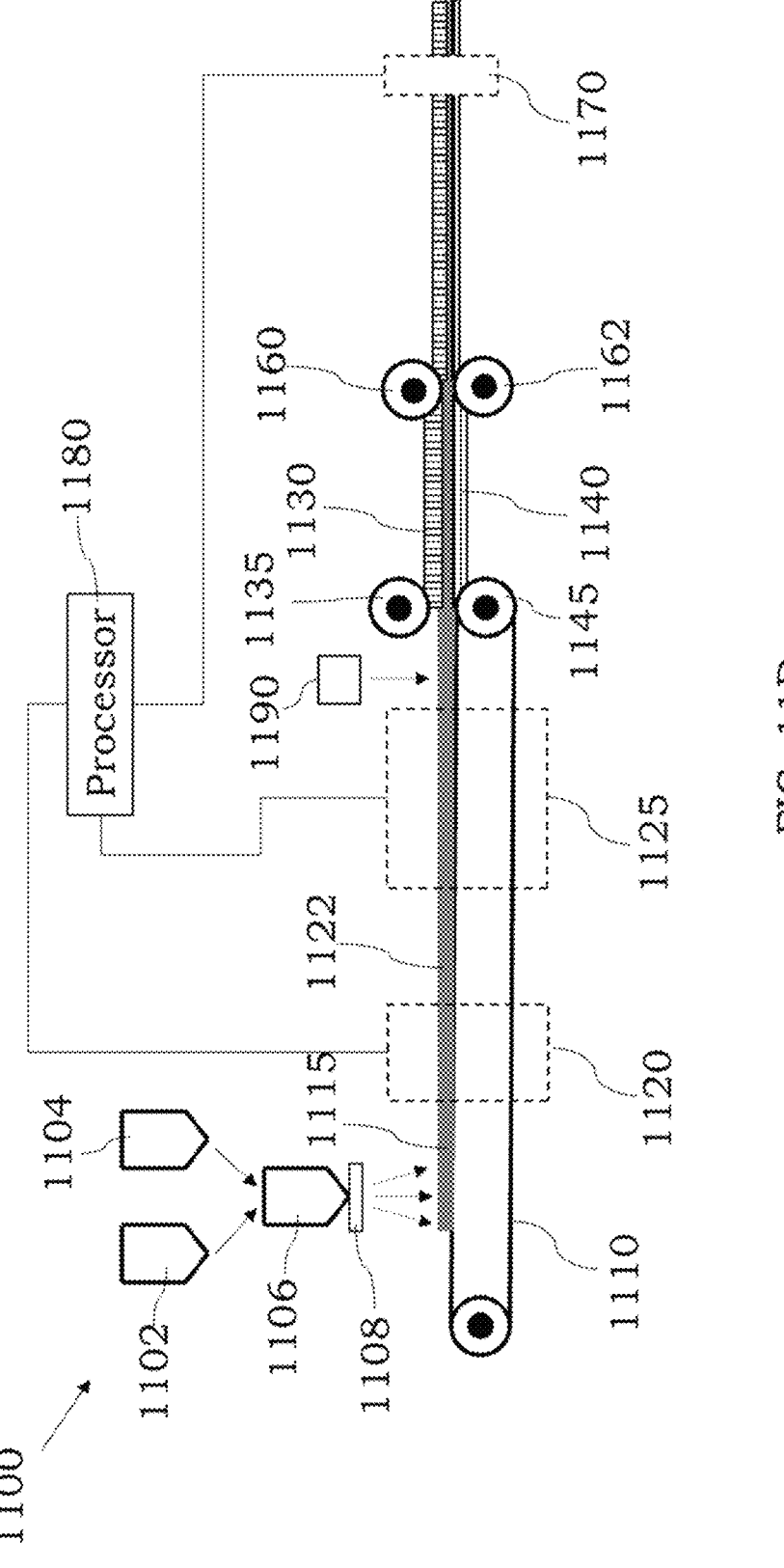

In certain examples, the system 1100 can include other components which can be present before or after the cutting device 1170. For example, the system 1100 can include another cutting station 1175 (FIG. 11B) designed to cut a tongue into one edge of the composite article and a cut a groove into an opposite edge of the composite article. This cutting permits different individual panels to fit into each other in use so there is some panel overlap at the joints. Joint overlap may be particularly desirable in wet applications to prevent water from penetrating behind the surface of the panels. In other instances, the system 1100 can include another heating device 1185 (FIG. 11C) that can be used to loft or increase a thickness of the composite article. The heating device 1185 can be positioned before or after the cutting device 1170 as desired. An optional adhesive reservoir 1190 (FIG. 11D) can be present to provide an adhesive to the core layer before application of the skin layer 1130. A second adhesive reservoir (not shown) can also be present to provide an adhesive to the core layer before application of the skin layer 1140. If desired, a surface of the composite article can be subjected to physical processes, e.g., the textured film layer can be sanded, polished, etched or embossed, to alter the surface roughness or impart a desired pattern or texture to the film layer.

In some embodiments, a system can include multiple sets of rollers. The different rollers can be present at different temperature or provide different gap thicknesses to compress the composite article prior to exit of the composite article from the moving support. In some instances, the rollers can be used to compress edges of the composite article to a higher degree so the overall thickness at the edges of the composite article are lower than at a central area of the composite article. The thickness at different edges can be the same or can be different.

In other embodiments, a system can include a printer that can print a pattern onto a skin layer prior to applying the skin layer to the core layer. The printer can spray, print or otherwise deposit an ink and other material, e.g., fibers, particles, powders, etc., onto a surface of the skin layer prior to the skin layer being applied to the core layer or after the skin layer is applied to the core layer. For example, the printer can be positioned near the roll 1135 of the film layer to print a pattern onto a surface of the skin layer 1130 as it is unrolled from the roll 1135. Alternatively, a printer can print a pattern onto the skin layer 1130 after it has been applied to a surface of the core layer. The exact pattern provided by the printer can vary and may be different at different areas of the skin layer. For example, the pattern printed onto the skin layer may be one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern. In other instances, an embosser can be present and used to impart a pattern or texture to the film layer. The embosser may be used, for example, after the LWRT article exits the moving support. The LWRT article can be squeezed between multiple plates to impart a pattern from the plate(s) to one or more surfaces of the LWRT article.

Figures 12, 13:
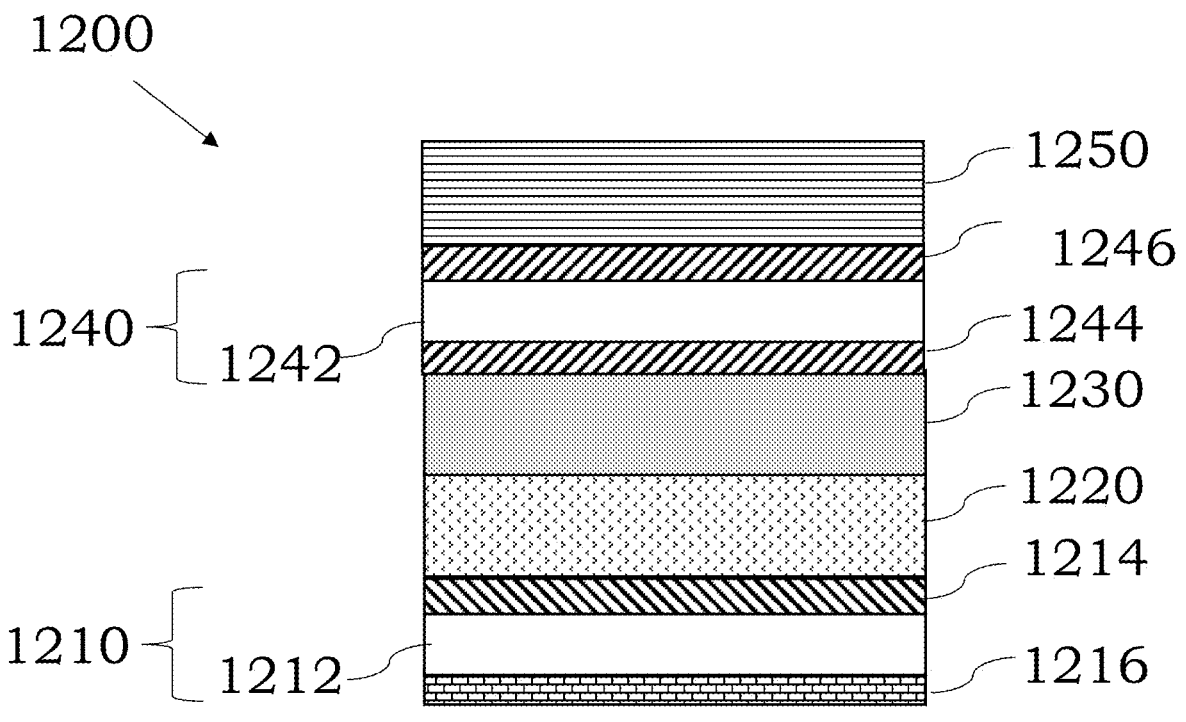
FIG. 12 is an illustration of a recreational vehicle (RV) ceiling, in accordance with some embodiments.
FIG. 13 is an illustration of a recreational vehicle that can include an RV ceiling as described herein, in accordance with some examples.

In certain embodiments, the in-line processes and in-line system described herein can be used to produce a ceiling panel. The ceiling panel can be present in a recreational vehicle or other vehicles, in commercial and residential structures or in other settings. One illustration is shown in FIG. 12 where an RV ceiling 1200 includes a first laminated lightweight reinforced thermoplastic composite article 1210 comprising a porous core layer 1212, a first skin layer 1214 on a first surface of the porous core layer 1212 and a textured film layer 1216 on a second surface of the porous core layer 1212. The textured film layer 1216 is typically positioned so it faces an interior portion of the space formed by the RV. The RV ceiling 1200 can also include an optional foam layer 1220 coupled to the first laminated lightweight reinforced thermoplastic composite article 1210 at a first surface of the foam layer 1220. For example, the foam layer 1220 can be coupled to the first laminated lightweight reinforced thermoplastic composite article 1210 through the first skin layer 1214 of the first laminated lightweight reinforced thermoplastic composite article 1210 so the textured film layer 1216 is present on an interior surface of the RV ceiling 1200. The RV ceiling 1200 also typically includes a support structure 1230, which can take the form of a chassis, tubing, a cage or other structures. The support structure 1230 typically includes a metal such as steel, aluminum or the metals. The support structure 1230 can be coupled a second surface of the foam layer 1220 at a first surface of the support structure 1230. An optional second laminated lightweight reinforced thermoplastic composite article 1240 can be coupled to a second surface of the support structure 1230. The second laminated lightweight reinforced thermoplastic composite article 1240 comprises a porous core layer 1242, a first skin layer 1244 on a first surface of the porous core layer 1242 and a second skin layer 1246 on a second surface of the porous core layer 1242. An exterior panel 1250 can be coupled to the second laminated lightweight reinforced thermoplastic composite article 1240 to form the RV ceiling 1200. Alternatively, the LWRT article 1240 can be omitted and the exterior panel 1250 can be coupled directly to the support structure 1230. In some examples, the exterior panel 1250 comprises fiberglass or aluminum.

As noted herein, the textured film layer 1216 can include a pattern that is one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern. In certain embodiments, the first skin layer 1214 of the first laminated lightweight reinforced thermoplastic composite article 1210 comprises a scrim. In certain examples, the porous core layer 1212 in the first laminated lightweight reinforced thermoplastic composite article 1210 can include a web comprising open cell structures formed from reinforcing fibers held together by a thermoplastic material as noted above. In some examples, the porous core layer 1242 in the second laminated lightweight reinforced thermoplastic composite article comprises a web comprising open cell structures formed from reinforcing fibers held together by a thermoplastic material. In some configurations, the thermoplastic material in each porous core layer 1210, 1240 independently comprises a thermoplastic material as noted herein, e.g., a polyolefin such as, for example, polypropylene, polyethylene, etc. In some embodiments, the reinforcing materials in each porous core layer comprise reinforcing fibers as noted herein, e.g., glass fibers.

In certain embodiments, the RV ceiling may be present in a RV comprising a roof, side walls coupled to the roof, and a floor coupled to the sidewalls to provide an interior space within the recreational vehicle. One illustration is shown in FIG. 13, where an RV 1300 comprises an RV ceiling 1312, which can be similar to the RV ceiling 1200 described above. The RV 1300 also includes side walls 1313, 1314 and a floor 1316. The RV 1300 may include wheels 1352, 1354 to permit towing of the RV and/or may include an engine, electric motor or other power source to permit independent movement of the RV.

Figure 14A:
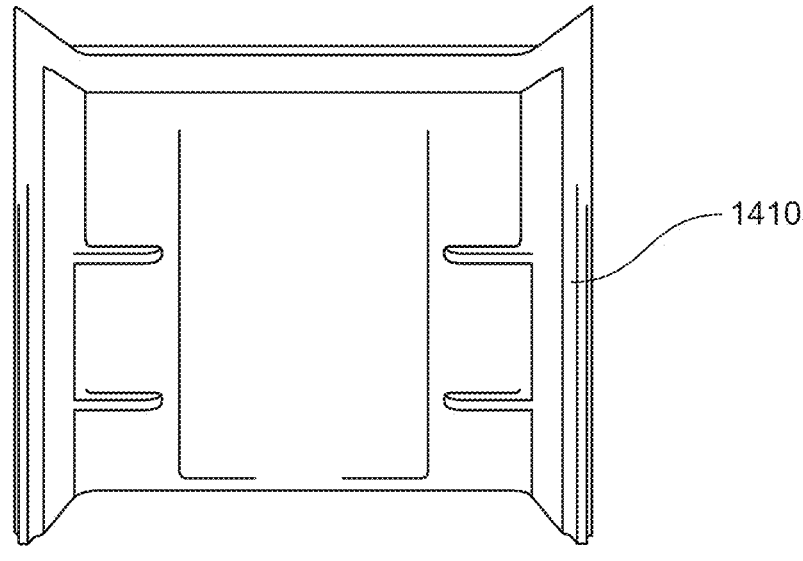
FIG. 14A and FIG. 14B are illustrations of shower enclosures, in accordance with some embodiments.
Figure 14B:
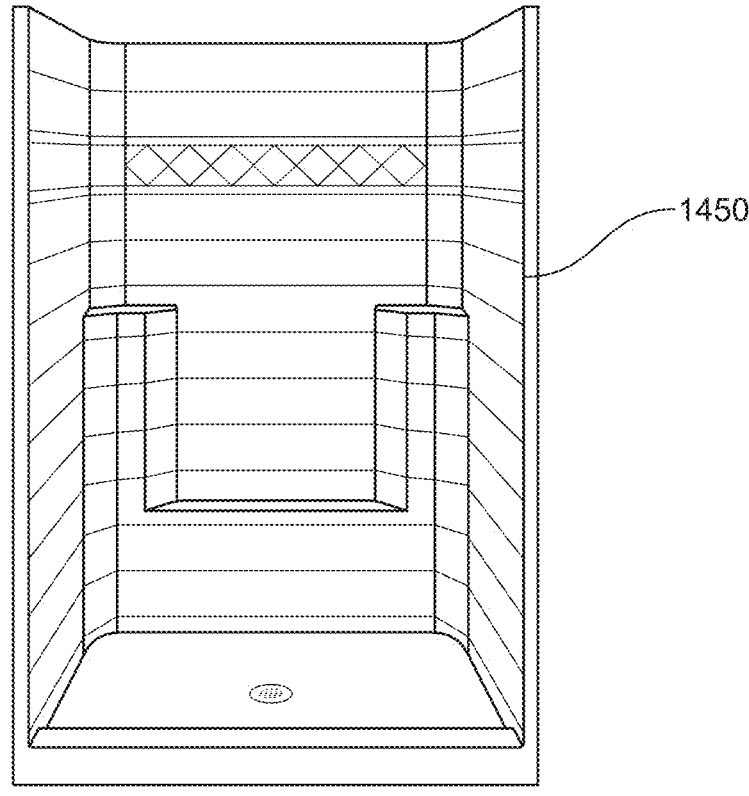

In certain embodiments, the panels including a textured film layer as described herein may be particularly suited for use in wet applications where the panel will be exposed to water. This water may be present in an interior environment, e.g., in a shower or a RV shower, or may be present in an exterior environment, e.g., as a roofing panel, building siding, etc. One illustration of a shower is shown in FIG. 14A, where the shower stall 1410 can be configured as a stall including one or more panels that comprises a LWRT panel including a textured film as described herein. The shower stall 1410 has three panels any one or more of which can be a LWRT panel comprising a textured film. While not shown, the shower stall 1410 is typically used with a shower pan or receptacle, which together provide a generally watertight shower enclosure suitable for use in residential applications. If desired, the shower could be configured as a single solitary piece of material as shown in FIG. 14B. The shower enclosure 1450 has an integrated shower pan or receptacle, sidewalls and a back wall. Any one or more surfaces of the enclosure 1450 can be produced using a LWRT article with a textured film as described herein. In certain wet bath RV applications, the shower enclosure 1450 can also include a toilet or be designed to receive a toilet.

Figure 15A:
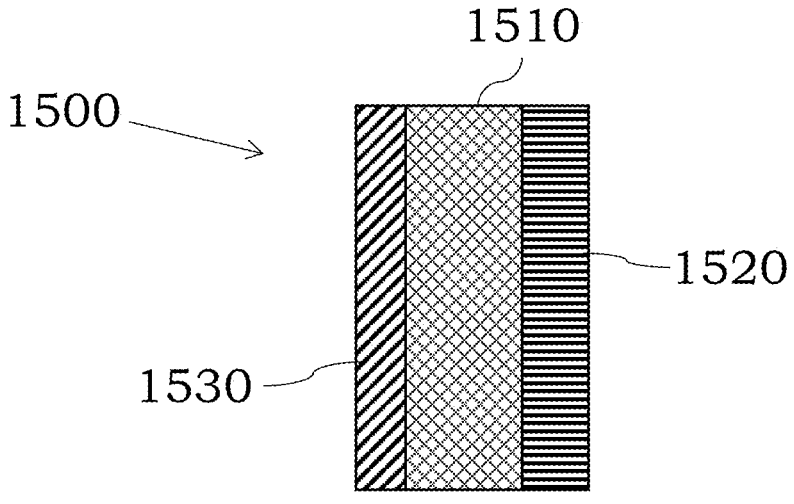
FIG. 15A and FIG. 15B are illustration of a siding panel and a roofing panel, respectively, in accordance with certain embodiments.

Referring to FIG. 15A, a side view of a siding panel 1500 is shown. The panel 1500 may comprise a core layer 1510 in combination with a textured film layer 1520 and a skin layer 1530. In some examples, the siding panel 1500 may be configured with a flame retardant or generally be flame retardant. For example, the siding panel 1500 comprises a flame spread index of less than 25 and a smoke development index of less than 150 as tested by ASTM E84 dated 2009. In some cases, a butt joint, overlapping joint, etc. may exist where the two siding panels can horizontally lock into each other.

Figure 15B:
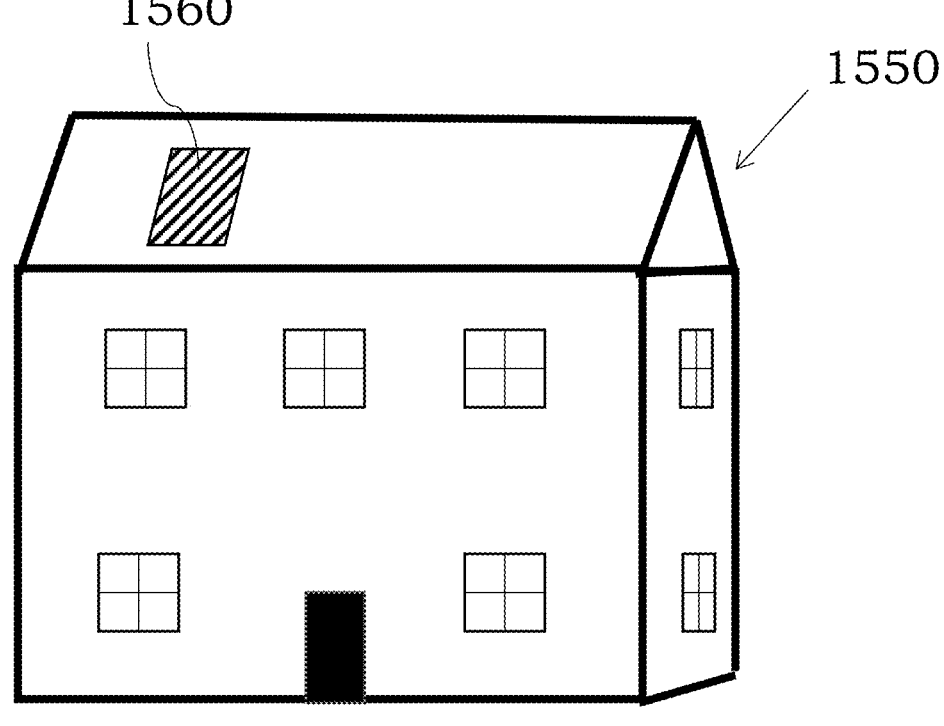

In certain instances, any one or more of the LWRT panels with a textured film described herein can be configured as a roofing panel or a roofing shingle to be attached to a building such as a residential home or a commercial building. The roofing panel can be used, for example, to cover an attic space, attach to roof trusses or cover a flat roof as commonly present in commercial buildings. If desired, the roofing panel can be coupled to another substrate such as, for example, oriented strand board, plywood, or even solar cells that attach to a roof and function to cover the roof. Referring to FIG. 15B, a perspective view of a roofing panel 1560 attached to a house 1550 is shown. In some examples, the roofing panel 1560 comprises a flame retardant, or itself is flame retardant, and is coupled to an underlying roofing substrate. If desired, the roofing panel 1560 may comprise a flame spread index of less than 25 and a smoke development index of less than 150 as tested by ASTM E84 dated 2009. The roofing panel 1560 could instead be configured as a roofing shingle that can nail to, or otherwise couple, to an underlying roofing substrate. In some cases, a butt joint, overlapping joint, etc. may exist where the two roofing panels or roofing shingles can horizontally lock into each other.

In certain examples, the in-line methods and in-line systems described herein may be controlled using one or more processors, which can be part of the in-line system or otherwise electrically coupled to the in-line system through an associated device, e.g., computer, laptop, mobile device, etc. For example, the processor can be used to control the mixing speed of the materials, the speed of the moving support, the pressure used to remove liquid from the disposed dispersion, the temperature of the heating device(s), the pressure applied to the materials and other parameters of the process and system. Such processes may be performed automatically by the processor without the need for user intervention or a user may enter parameters through a user interface. In certain configurations, the processor may be present in one or more computer systems and/or common hardware circuitry including, for example, a microprocessor and/or suitable software for operating the system, e.g., to control the various fluid reservoirs, mixing tank, pressure devices, speed, temperatures, etc. The processor can be integral to the in-line system or may be present on one or more accessory boards, printed circuit boards or computers electrically coupled to the components of the in-line system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Intel Core™ processors, Intel Xeon™ processors, AMD Ryzen™ processors, AMD Athlon™ processors, AMD FX™ processors, Motorola PowerPC, Sun UltraSPARC, Hewlett-Packard PA-RISC processors, Apple-designed processors including Apple A14 Bionic processor, A13 Bionic processor, A12 processor, Apple A11 processor and others or any other type of processor. One or more of any type computer system may be used according to various embodiments of the technology. Further, the system may be connected to a single computer or may be distributed among a plurality of computers attached by a communications network. If desired, different components of the in-line system may be controlled by a respective processor or computer that is separate from a processor or computer used to control other components of the in-line system. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, temperatures, moving support speeds and other values used in the in-line process. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. The processor typically is electrically coupled to a power source which can, for example, be a direct current source, an alternating current source, a battery, a solar cell, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface, a USB interface, a Fibre Channel interface, a Firewire interface, a M.2 connector interface, a PCIE interface, a mSATA interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable nonvolatile recording medium in which codes of software can be stored that can be used by a program to be executed by the processor or information stored on or in the medium to be processed by the program. The medium may, for example, be a hard disk, solid state drive or flash memory. The program or instructions to be executed by the processor may be located locally or remotely and can be retrieved by the processor by way of an interconnection mechanism, a communication network or other means as desired. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC), microprocessor units MPU) or a field programmable gate array (FPGA) or combinations thereof.

Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known microprocessors available from Intel, AMD, Apple and others. Many other processors are also commercially available. Such a processor usually executes an operating system which may be, for example, the Windows 7, Windows 8 or Windows 10 operating systems available from the Microsoft Corporation, MAC OS X, e.g., Snow Leopard, Lion, Mountain Lion, Mojave, High Sierra, El Capitan or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the in-line system remotely as desired.

In certain examples, the processor may also comprise or have access to a database of information about specific articles to be produced. For example, specific parameters used to produce a core layer of a desired thickness and composition can be retrieved from the database and used by the in-line system. The instructions stored in the memory can execute a software module or control routine for the system, which in effect can provide a controllable model of the in-line system. The processor can use information accessed from the database together with one or software modules executed in the processor to determine control parameters or values for different components of the systems, e.g., different temperatures, different pressures, different consolidation devices, etc. Using input interfaces to receive control instructions and output interfaces linked to different system components in the system, the processor can perform active control over the system.

Certain specific examples of LWRT articles that were produced using an in-line process and tested are discussed below.

Example 1

A LWRT article was prepared by adding chopped glass fibers (e.g., 30-70% by weight) into a polypropylene (PP) resin matrix as reinforcement in an in-line process as described herein to form a web or core. A textured film layer was added to one surface of the core and a second skin (a 23 gsm water repellent black scrim) was added to an opposite surface using the in-line process along with in-line calendering to press the skins to the core and form an LWRT article. The various properties of the films and LWRT articles are shown in Table 1 in FIG. 16. Six different textured films were used with basis weights ranging from 110 gsm to 166 gsm. The film thickness varied from 0.17 mm to 0.30 mm. Different films included different decoration/texture.

Figure 17A:
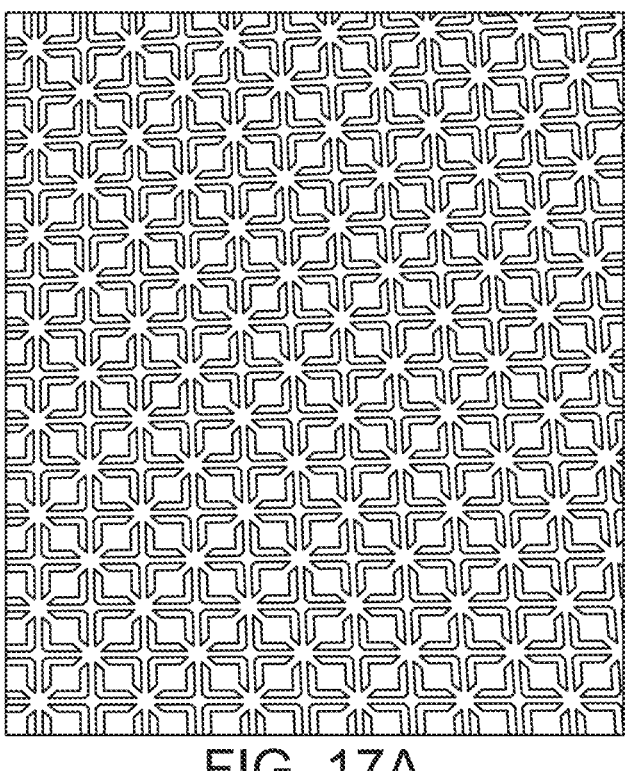
Figure 17B:
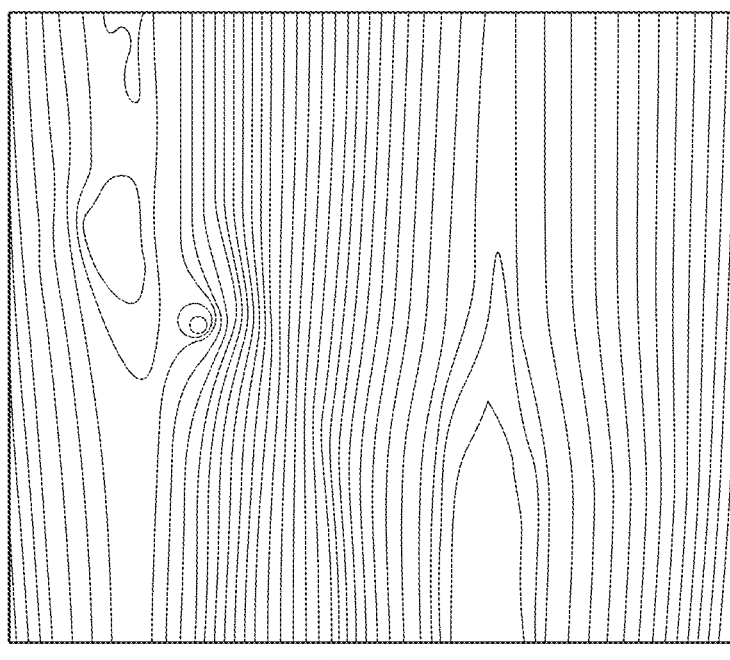
Figure 17C:
Figure 17D:
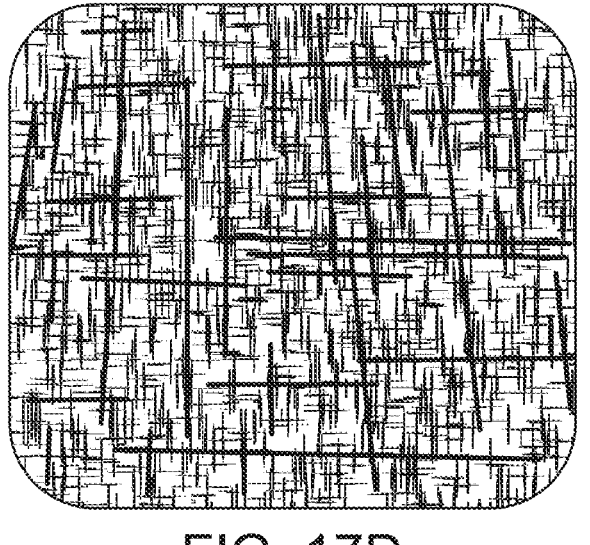
Figure 17E:
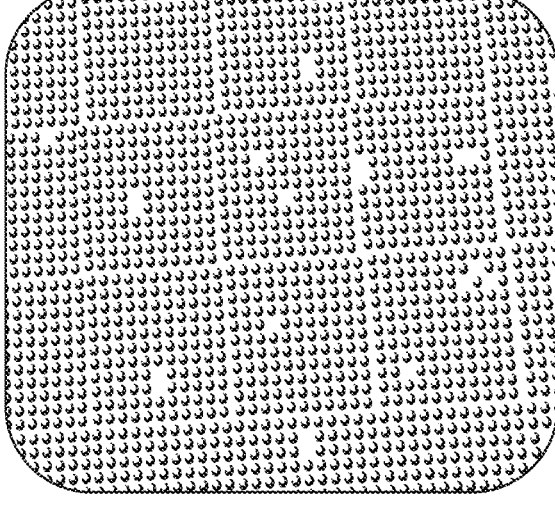

Film #1 included both printing and embossing and a random square pattern (see FIG. 17A). Film #2 includes deep embossing and a white woodgrain pattern (see FIG. 17B). Film #3 included printing and embossing and a dark woodgrain pattern (see FIG. 17C). Film #4 included printing with deep embossing, rough/coarse spikes on the backside of the film and a dark fabric pattern (see FIG. 17D (A or front surface) and FIG. 17E (B or back surface)). Film #5 includes printing and shallow embossing and a grey fabric pattern (see FIG. 17F (A or front surface) and FIG. 17G (B or back surface)). Film #6 included printed and shallow embossing with a coarse fabric and pattern (see FIG. 17H (A or front surface) and FIG. 17I (B or back surface)). Where a top thermoset coating is indicated in Table 1 (Film 3), the top thermoset coating can be one or more of epoxy resins, acrylic resins, polyester resins, polycarbonate resins, melamine-formaldehyde resins, or polyurethane resins. As a representative film, Film #3 was tested for its ability to meet indoor air quality tests. Film #3 passed indoor air quality test for total volatile organic compounds, toluene and formaldehyde.

These films were used along with the 23 gsm water repellent scrim and a polypropylene glass fiber core (45% by weight PP and 55% by weight glass fibers) to provide LWRT articles with a basis weight of 960 g/m² as shown in Table 2 in FIG. 18.

Example 2

Surface roughness (Rt) measurements were performed for the various LWRT articles of Example 1 and the films used in Example 1. The results are shown in Table 3 in FIG. 19. The machine direction refers to the same direction of movement as the moving support, and the cross direction is perpendicular to the machine direction. Roughness can indirectly indicate the embossing depth retaining level with High Rt values suggesting deeper texture. Depending on whether the film is embossed only or "embossment+top surface coating", some textures' depth can be retained better, i.e. film #2 and ST-13636, while other patterns can lose 50% depth of the texture, such as Film #4, Film #5, and Film #6. Therefore, a various levels of texture depth can be adopted according to applications and preferences. Films #1-4 provided relatively much deeper/rougher textures compared to Films #5 and 6.

Example 3

Flame retardancy measurements of the various samples were performed according to a FMVSS 302 standard. FMVSS 301 is similar to ASTM E84. During the testing, the textured film surface faced the flame.

The results are shown in Table 4 in FIG. 20. For comparison, a similar core with 23 gsm scrims on both sides has a burning rate value of 2.1 inch/min according to FMVSS302. Only sample ST-13928 had a higher burning rate than reference scrim/core/scrim/board, indicating most boards with films provided a good or better flame retardancy than the reference board. These results are consistent with the LWRT articles meeting a Class A or Class B standard under ASTM E84.

Example 4

Additional properties of the boards were also measured for the articles including ash %, thickness, basis weight, density, scrim adhesion, film adhesion, flexural peak load, flexural stiffness, water retention, surface energy and flatwise tensile peak load. The results are shown in Tables 5 and 6 in FIGS. 21 and 22.

The presence of the textured film generally increases the stiffness of the LWRT board. The film surface is very water resistant, while the scrim surface also provides good water resistance too. Flatwise tensile test results indicated these in-line laminated boards would be much stronger than EPS or other insulation foams, suggesting these in-line laminated boards will not fail before the foam fails.

Adhesion (hot-melt) layer of Films #1-3 can help them bond well with LWRT composite core. A deep embossing type film, like Film #4 (ST-13799), can help with mechanical bonding to a LWRT composite core as well. Films #5 and #6 do not have hot-melt adhesive layer on a backside and their embossing types belong to a category of shallow embossment. Therefore, the film/core adhesion is not as good as the other 4 samples.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

What is claimed is:

1. An in-line process of producing a thermoplastic composite article using an in-line system, the in-line process comprising:
   combining reinforcing materials and a thermoplastic material in an aqueous solution;
   disposing the aqueous solution with the combined reinforcing materials and the thermoplastic material onto a moving support;
   removing water from the disposed aqueous solution on the moving support to form a porous web comprising open cell structures formed from the reinforcing materials and the thermoplastic material;
   drying the porous web on the moving support to provide a porous core layer;
   heating the dried, porous core layer on the moving support to melt the thermoplastic material of the heated, porous core layer;
   disposing a first textured film layer on a first surface of the heated, porous core layer on the moving support; and
   applying pressure to the heated, porous core layer comprising the disposed first textured film layer on the moving support to provide a thermoplastic composite article and retain texture of the first textured film layer on the thermoplastic composite article.

2. The in-line process of claim 1, wherein the porous core layer is heated at a first temperature above the melting point of the thermoplastic material and below the melting point of the reinforcing materials.

3. The in-line process of claim 1, further comprising adding a foam to the aqueous solution with the combined reinforcing materials and the thermoplastic material.

4. The in-line process of claim 1, further comprising adding a lofting agent to the aqueous solution with the combined reinforcing materials and the thermoplastic material.

5. The in-line process of claim 1, further comprising configuring the first textured film layer as a polyolefin film.

6. The in-line process of claim 5, further comprising configuring the polyolefin film to comprise a maximum height surface roughness (Rt) of at least 8 microns as measured using a stylus profilometer.

7. The in-line process of claim 6, wherein the first textured film layer further comprises a pattern.

8. The in-line process of claim 7, wherein the pattern is one or more of a woodgrain pattern, a marble pattern, a tile pattern, a random pattern, a pinwheel pattern, a herringbone pattern, a brick pattern, an offset staggered brick pattern, an offset pattern, a grid pattern, a stacked vertical pattern, a French pattern, a basket weave pattern, a diamond pattern, or a chevron pattern.

9. The in-line process of claim 1, further comprising stretching the first textured film layer prior to disposing the first textured film layer on the first surface of the heated, porous core layer on the moving support.

10. The in-line process of claim 9, wherein the first textured film layer is stretched in a machine direction.

11. The in-line process of claim 1, wherein the first textured film layer is disposed on the heated, porous core layer without using any adhesive between the first textured film layer and the heated, porous core layer.

12. The in-line process of claim 1, further comprising disposing a skin layer on a second surface of the heated, porous core layer on the moving support.

13. The in-line process of claim 12, further comprising disposing an adhesive on the second surface of the heated, porous core layer prior to disposing the skin layer on the second surface.

14. The in-line process of claim 1, further comprising configuring the thermoplastic composite article to meet a class B standard as tested by ASTM E84 dated 2009 with a flame spread index of 26-75 and a smoke development index of no greater than 450.

15. The in-line process of claim 14, further comprising configuring the thermoplastic composite article to meet a class A standard as tested by ASTM E84 dated 2009 with a flame spread index up to 25 and a smoke development index of no larger than 450.

16. The in-line process of claim 1, further comprising consolidating the heated, and porous core layer prior to disposing the first textured film layer on the first surface.

17. The in-line process of claim 16, further comprising heating the thermoplastic composite article after consolidating the thermoplastic composite article to increase an overall thickness of the thermoplastic composite article.

18. The in-line process of claim 1, further comprising using a printer in the in-line system to print a pattern onto the first textured film layer after disposing the first textured film layer on the first surface of the heated, porous core layer.

19. The in-line process of claim 1, further comprising embossing the first textured film layer after disposing the first textured film layer on the first surface of the heated, porous core layer.

20. The in-line process of claim 1, further comprising disposing a non-porous layer on the first surface of the heated, porous core layer prior to disposing the first textured film layer.

\* \* \* \* \*